(12) United States Patent
Hattori

(10) Patent No.: US 8,248,722 B2
(45) Date of Patent: Aug. 21, 2012

(54) LENS BARREL AND IMAGING APPARATUS

(75) Inventor: Kazuhiro Hattori, Tokyo (JP)

(73) Assignee: Sony Corporation (JP)

( * ) Notice: Subject to any disclaimer, the term of this patent is extended or adjusted under 35 U.S.C. 154(b) by 231 days.

(21) Appl. No.: 12/661,056

(22) Filed: Mar. 10, 2010

(65) Prior Publication Data

US 2010/0246033 A1    Sep. 30, 2010

(30) Foreign Application Priority Data

Mar. 24, 2009   (JP) ................. P2009-072576

(51) Int. Cl.
*G02B 7/02* (2006.01)
(52) U.S. Cl. .................................... 359/827
(58) Field of Classification Search .............. 359/827
See application file for complete search history.

(56) References Cited

U.S. PATENT DOCUMENTS 5,768,649 A * 6/1998 Pearson ................. 396/529

FOREIGN PATENT DOCUMENTS

| JP | 62125306 A | 6/1987 |
|---|---|---|
| JP | 11337799 A | 12/1999 |
| JP | 2001-296463 A | 10/2001 |
| JP | 2002040308 A | 2/2002 |
| JP | 2002-196206 A | 7/2002 |

OTHER PUBLICATIONS

Office Action from Japanese Application No. 2009-072576, dated Jan. 18, 2011.

* cited by examiner

*Primary Examiner* — Joseph P Martinez
(74) *Attorney, Agent, or Firm* — Lerner, David, Littenberg, Krumholz & Mentlik, LLP

(57) ABSTRACT

Disclosed herein is a lens barrel including a lens having a reference portion, a barrel body having a supporting portion adapted to come into contact with the reference portion of the lens, and a lens holding member for holding the lens so that the lens is sandwiched between the lens holding member and the barrel body in the condition where the reference portion of the lens is biased against the supporting portion of the barrel body.

9 Claims, 17 Drawing Sheets

C ≧ D

LENS BARREL AND IMAGING APPARATUS

CROSS-REFERENCE TO RELATED APPLICATION

The present application claims priority from Japanese Patent Application No. JP 2009-072576 filed in the Japanese Patent Office on Mar. 24, 2009, the entire content of which is incorporated herein by reference.

BACKGROUND OF THE INVENTION

1. Field of the Invention

The present invention relates to a lens barrel used in an imaging apparatus such as a digital still camera and a video camera, and more particularly to a lens barrel and an imaging apparatus including the lens barrel, wherein alignment for adjusting the relative positional relation between lenses provided in a barrel body can be performed easily and accurately with a simple structure.

2. Description of the Related Art

In general, a lens barrel included in an imaging apparatus such as a digital still camera and a video camera is provided with a lens aligning mechanism for adjusting the optical axes of lenses. Lens alignment by the lens aligning mechanism is classified into tilt alignment for tilting the optical axis of a taking lens and shift alignment for moving the taking lens in a direction perpendicular to the optical axis of the taking lens.

An existing shift alignment mechanism for a lens barrel is described in Japanese Patent Laid-open No. 2002-196206 (Patent Document 1), for example. The shift alignment mechanism described in Patent Document 1 is a mechanism for adjusting a deviation in the optical axes of lenses in a lens barrel. The lens barrel in Patent Document 1 includes a holding member for holding lenses, a storing member for storing the holding member, and a deviation adjusting mechanism for moving the holding member in a plane perpendicular to the optical axis to thereby adjust the position of the optical axis. The holding member is stored in the storing member in such a manner as to abut against a wall portion of the storing member from its image plane side, wherein the wall portion is formed inside the storing member so as to project toward the optical axis. The deviation adjusting mechanism has an operating portion mounted on the object side of the wall portion so as to be rotatably operated from the object side in performing the adjustment, wherein the operating portion has a pin eccentric from the axis of rotation of the operating portion. By the eccentric rotation of the pin, the holding member is moved in a plane perpendicular to the optical axis.

According to the lens barrel described in Patent Document 1, it is unnecessary to increase the diameter of the lens barrel in order to avoid the interference between the deviation adjusting mechanism and the other members stored in the storing member as in the case that the deviation adjusting mechanism is located on the image plane side of the wall portion of the storing member. As a result, the diameter of the lens barrel described in Patent Document 1 can be reduced.

Another existing shift alignment mechanism for a lens barrel is described in Japanese Patent Laid-open No. 2001-296463 (Patent Document 2), for example. A lens frame structure for holding a lens used in optical equipment such as a camera and a video camera is described in Patent Document 2. The lens frame structure described in Patent Document 2 includes a reference frame member, a lens member held by the reference frame member, and a supporting portion for supporting the lens member. The supporting portion supports the lens member in such a manner that the lens member is in contact with the reference frame member at two positions lying on a line perpendicular to the optical axis of the lens member and that the optical axis of the lens member can be tilted with respect to the reference axis of the reference frame member, i.e., tilt movement can be performed.

According to the lens frame structure described in Patent Document 2, the lens member is in contact with the reference frame member at two positions lying on a line perpendicular to the optical axis of the lens member, so that tilt movement, shift movement, and rotational movement can be independently performed, thereby allowing a minute operation. Accordingly, fine lens alignment can be performed.

However, the lens barrel described in Patent Document 1 has a problem such that the number of parts is large and the structure is complicated, causing an increase in overall size and an increase in cost.

On the other hand, in the lens frame structure described in Patent Document 2, a lens holding frame is fixed to a reference frame by an adhesive, and a fixed condition of the lens holding frame is maintained by only an adhesive force of the adhesive. That is, the existing lens frame structure does not include biasing means for holding the lens holding frame. Accordingly, an unwanted tilt occurs in the lens holding frame and the direction of placement of the lens barrel is limited in performing the lens alignment. Further, since the weights of the lens and the lens holding frame are supported by only the adhesive, there is a possibility that the lens may be misaligned due to an unexpected impactive force or the like.

SUMMARY OF THE INVENTION

It is accordingly desirable to provide a lens barrel which can be reduced in number of parts and simplified in structure, thereby expecting an overall size reduction.

It is also desirable to provide a lens barrel which can eliminate an unwanted tilt of a lens and prevent the misalignment of the lens due to an unexpected impactive force or the like.

It is also desirable to provide an imaging apparatus including such a lens barrel.

In accordance with an embodiment of the present invention, there is provided a lens barrel including a lens having a reference portion; a barrel body having a supporting portion adapted to come into contact with the reference portion of the lens; and a lens holding member for holding the lens so that the lens is sandwiched between the lens holding member and the barrel body in the condition where the reference portion of the lens is biased against the supporting portion of the barrel body.

In accordance with another embodiment of the present invention, there is provided an imaging apparatus including a body portion; and a lens barrel mounted on the body portion; the lens barrel including a lens having a reference portion, a barrel body having a supporting portion adapted to come into contact with the reference portion of the lens, and a lens holding member for holding the lens so that the lens is sandwiched between the lens holding member and the barrel body in the condition where the reference portion of the lens is biased against the supporting portion of the barrel body.

Other features of the invention will be more fully understood from the following detailed description and appended claims when taken with the accompanying drawings.

DETAILED DESCRIPTION OF THE PREFERRED EMBODIMENTS

First Preferred Embodiment

Figure 1:
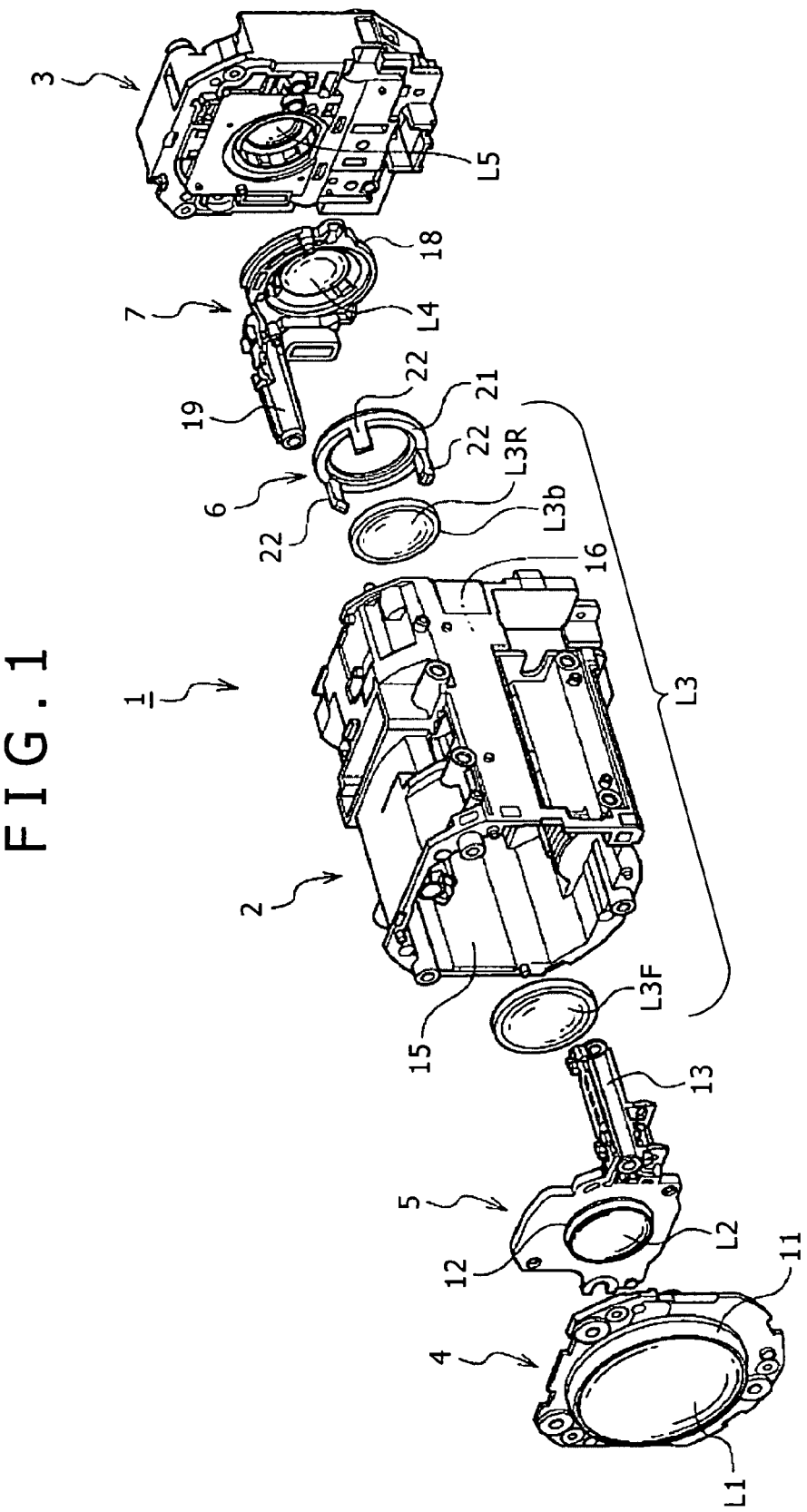
FIG. 1 is an exploded perspective view of a lens barrel according to a first preferred embodiment of the present invention.

FIGS. 1 to 7 show a lens barrel 1 according to a first preferred embodiment of the present invention, wherein the lens barrel 1 is configured as an interchangeable lens for use in a digital single-lens reflex camera or the like. Referring to FIG. 1, the lens barrel 1 is composed of a taking optical system including a plurality of lenses, filters, and other optical parts and a mechanical system including a cylindrical member, annular member, frame member, and other members for fixing or movably supporting various components of the taking optical system. The mechanical system of the lens barrel 1 can be manually operated and also automatically operated by a power system such as a motor and gears. That is, focusing in the lens barrel 1 can be manually performed and also automatically performed through a motor or the like.

As shown in FIG. 1, the taking optical system of the lens barrel 1 is configured by the combination of five lens groups, i.e., a first lens group L1, second lens group L2, third lens group L3, fourth lens group L4, and fifth lens group L5 arranged in this order from the subject side. The first lens group L1 is configured by the combination of a plurality of lenses. The second lens group L2 is also configured by the combination of a plurality of lenses. Each of the fourth lens group L4 and the fifth lens group L5 is configured by one lens or the combination of a plurality of lenses.

The third lens group L3 is configured by the combination of two lenses, i.e., a first lens L3F and a second lens L3R spaced a given distance from each other along the optical axis of the taking optical system. The third lens group L3 may be configured by the combination of three or more lenses or may be configured by one lens. The peripheral portion of the rear surface of the first lens L3F is formed as a reference surface L3a for positioning the first lens L3F at a given position in a main barrel 2. This reference surface L3a is a specific embodiment of the reference portion in the present invention. Further, the peripheral portion of the front surface of the second lens L3R is formed as a reference surface L3b for positioning the second lens L3R at a given position in the main barrel 2. This reference surface L3b is also a specific embodiment of the reference portion in the present invention.

An image sensor (not shown) such as a CCD (charge coupled device) and a CMOS (complementary metal oxide semiconductor) is provided on the back side of the fifth lens group L5. By adjusting the positions of the second lens group L2 and the fourth lens group L4, a focusing function and a zooming function can be exhibited. That is, a zooming operation can be performed mainly by adjusting the position of the second lens group L2, and a focusing operation can be performed mainly by adjusting the position of the fourth lens group L4.

The mechanical system of the lens barrel 1 includes a main barrel 2, rear barrel 3, first lens group holding frame 4, second lens group holding frame 5, third lens group holding frame 6, and fourth lens group holding frame 7. The first lens group holding frame 4 has an annular lens fixing portion 11, and the first lens group L1 is fixed to the annular lens fixing portion 11. The second lens group holding frame 5 has an annular lens fixing portion 12 and a cylindrical moving guide portion 13. The second lens group L2 is fixed to the annular lens fixing portion 12. A first guide shaft (not shown) is fixed to the main barrel 2, and this first guide shaft is slidably inserted in the cylindrical moving guide portion 13. Accordingly, the second lens group holding frame 5 can be guided by the first guide shaft and moved in parallel to the optical axis of the taking optical system.

The main barrel 2 is a first specific embodiment of the barrel body in the present invention. The main barrel 2 is configured as a hollow cylindrical member having an intermediate partition wall 14 for defining a front space 15 and a rear space 16. The second lens group holding frame 5 is movably accommodated in the front space 15 of the main barrel 2. Further, the first lens group holding frame 4 is mounted to the front opening portion of the front space 15 and removably fixed to the main barrel 2 by means of a plurality of screws. The intermediate partition wall 14 of the main barrel 2 is formed with a circular through hole 17 for passing the light from a subject. The first lens L3F of the third lens group L3 is provided in the front space 15 defined on the front side of the intermediate partition wall 14 having the through hole 17.

The second lens L3R of the third lens group L3 is provided in the rear space 16 defined on the rear side of the intermediate partition wall 14. Further, the fourth lens group holding frame 7 is movably accommodated in the rear space 16. The fourth lens group holding frame 7 has an annular lens fixing portion 18 and a cylindrical moving guide portion 19. The fourth lens group L4 is fixed to the annular lens fixing portion 18. A second guide shaft (not shown) is fixed to the main barrel 2, and this second guide shaft is slidably inserted in the cylindrical moving guide portion 19. Accordingly, the fourth lens group holding frame 7 can be guided by the second guide shaft and moved in parallel to the optical axis of the taking optical system.

Figure 2:
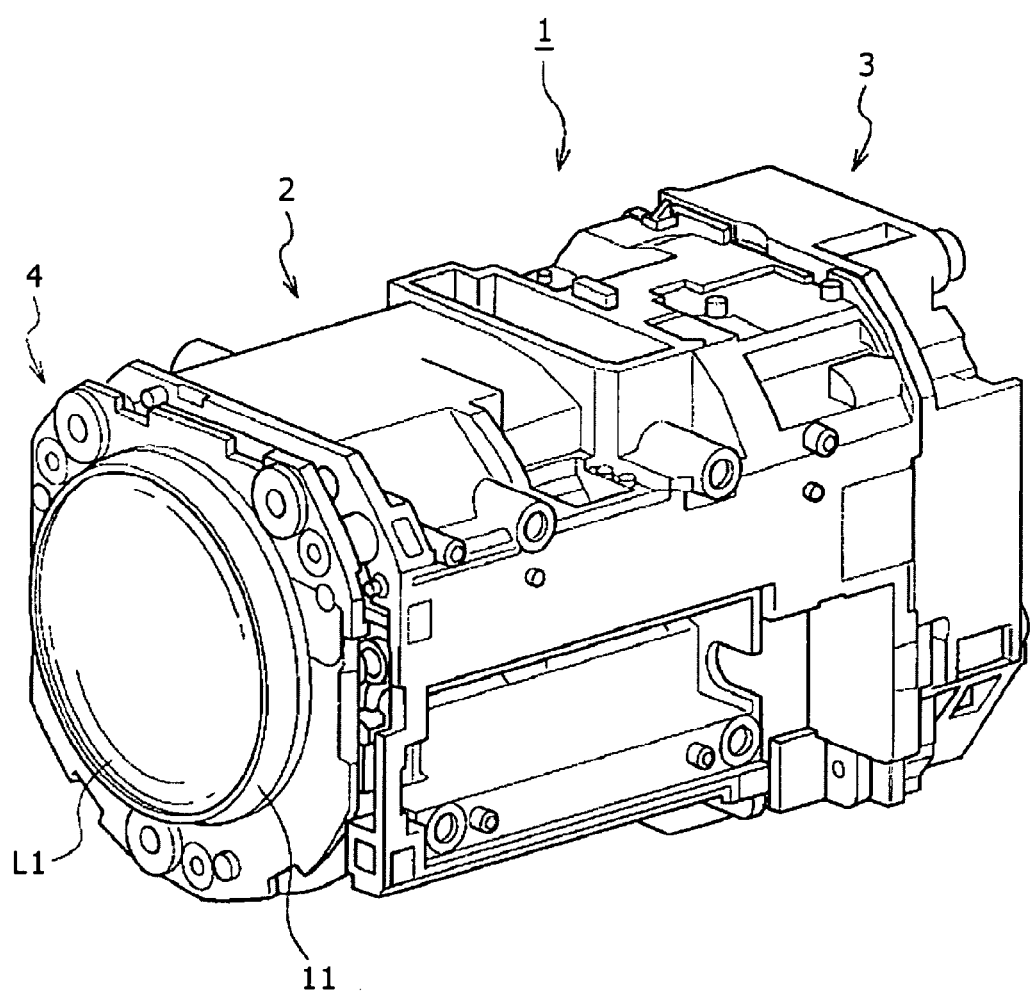
FIG. 2 is a perspective view of the lens barrel shown in FIG. 1 in the assembled condition thereof.

The rear barrel 3 is mounted to the rear opening portion of the rear space 16 of the main barrel 2 and removably fixed to the main barrel 2 by means of a plurality of screws. The image sensor (not shown) is fixed to the rear barrel 3. Thus, the second lens group holding frame 5, the third lens group holding frame 6, and the fourth lens group holding frame 7 are first installed into the inside space of the main barrel 2. Thereafter, the first lens group holding frame 4 and the rear barrel 3 are mounted to the front and rear opening portions of the main barrel 2, thereby assembling the lens barrel 1 as shown in FIG. 2.

Figure 3A:
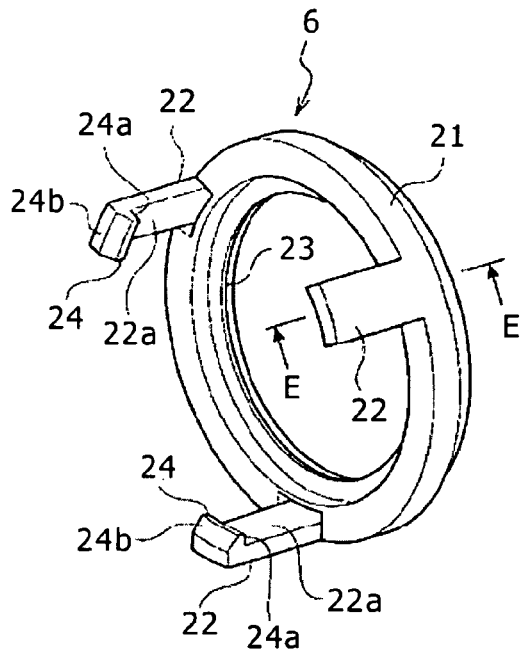
FIG. 3A is a perspective view of a lens holding member included in the lens barrel shown in FIG. 1
Figure 3B:
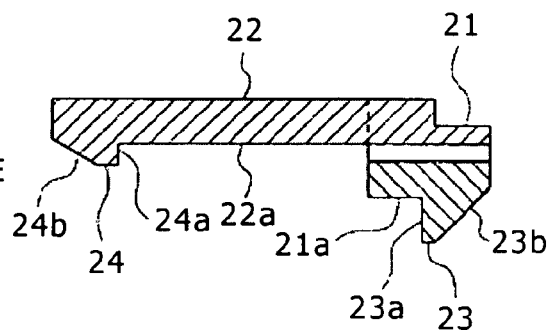
FIG. 3B is a cross section taken along the line E-E in FIG. 3A.

As shown in FIGS. 3A and 3B, the third lens group holding frame 6 is a first specific embodiment of the lens holding member in the present invention. The third lens group holding frame 6 has an annular portion 21 and three arm portions 22 projecting from one end surface of the annular portion 21 in a direction parallel to the optical axis. The annular portion 21 is formed with an annular hook 23 projecting radially inward and continuing in the circumferential direction. The annular hook 23 corresponds to the second hook portion for holding the second lens L3R in the present invention. The annular hook 23 has a trapezoidal shape in cross section such that a vertical surface 23a is formed so as to be perpendicular to an inner circumferential surface 21a of the annular portion 21 and that an inclined surface 23b is formed opposite to the vertical surface 23a so as to be inclined with respect thereto at a suitable angle.

The three arm portions 22 are located on a common circle and equally spaced from each other in the circumferential direction of the annular portion 21. The front end of each arm portion 22 is formed with a hook 24 projecting in the same direction as the direction of projection of the annular hook 23. Each hook 24 corresponds to the first hook portion for holding the first lens L3F in the present invention. Each hook 24 has a trapezoidal shape in cross section such that a vertical surface 24a is formed so as to be perpendicular to an inner surface 22a of each arm portion 22 and that an inclined surface 24b is formed opposite to the vertical surface 24a so as to be inclined with respect thereto at a suitable angle.

The third lens group holding frame 6 and a fifth lens group holding frame 51 to be hereinafter described are preferably formed of ABS (acrylonitrile butadiene styrene resin) or PC (polycarbonate), for example. However, any other engineering plastics may be used. In the case that the third lens group holding frame 6 is formed of ABS or PC as mentioned above, a suitable strength of elasticity can be given to each arm portion 22, so that each arm portion 22 can be elastically deformed in mounting the third lens group L3, thereby facilitating the mounting operation for the third lens group L3.

Figure 4:
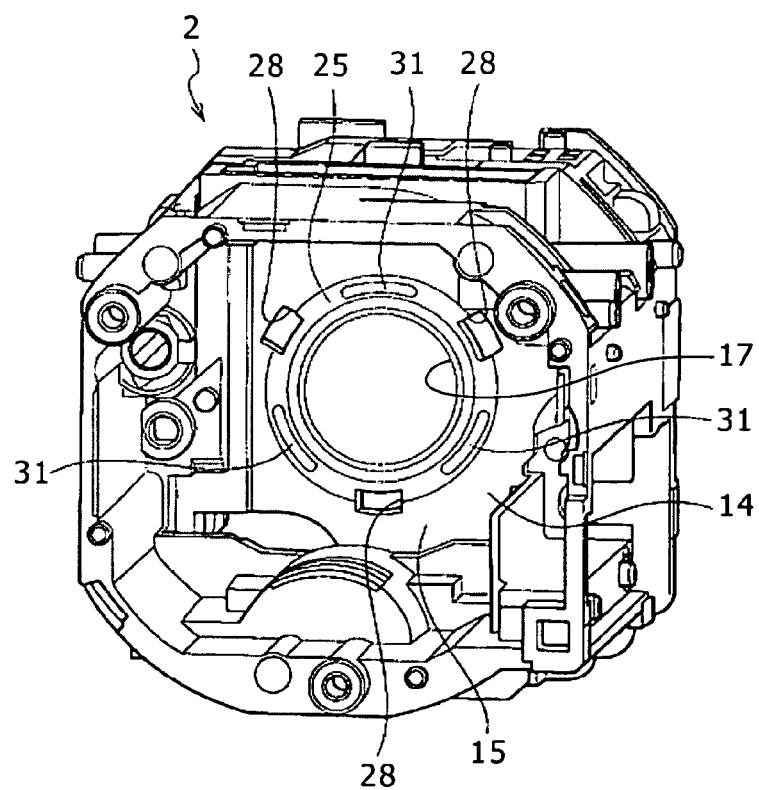
FIG. 4 is a perspective view of a main barrel included in the lens barrel shown in FIG. 1 as viewed from the front side thereof.
Figure 5:
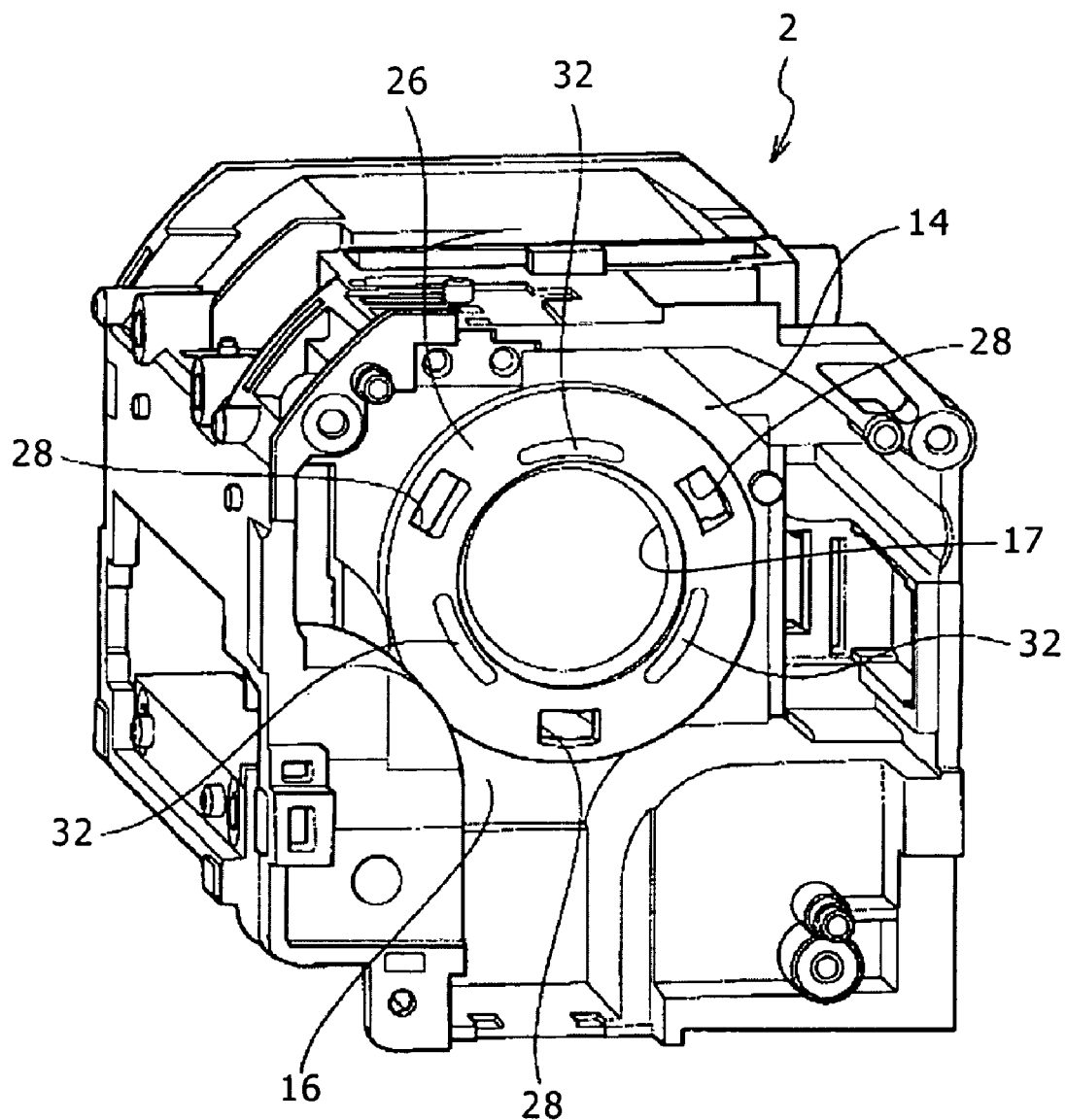
FIG. 5 is a perspective view of the main barrel as viewed from the rear side thereof.
Figure 6:
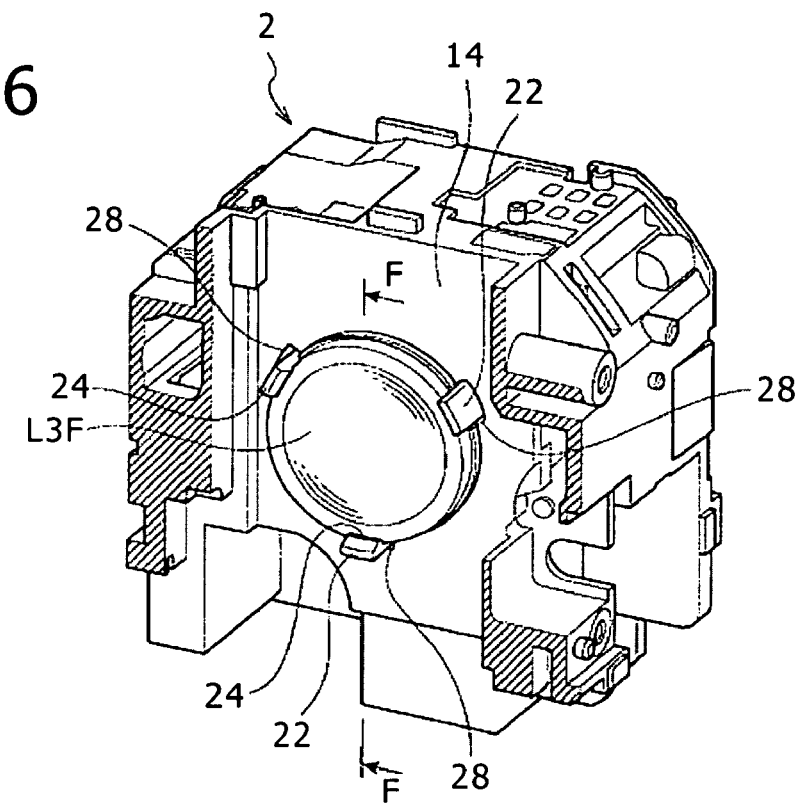
FIG. 6 is a partially cutaway, perspective view of the main barrel as cut along a vertical plane perpendicular to the optical axis at an axially intermediate portion thereof.

The inside structure of the main barrel 2 is shown in FIGS. 4 to 6. FIG. 4 is a perspective view of the main barrel 2 as viewed from the front upper side of the front space 15. As shown in FIG. 4, the partition wall 14 is formed at the axially central portion of the main barrel 2. FIG. 6 is a partially cutaway, perspective view of the main barrel 2 as cut along a vertical plane (perpendicular to the optical axis) at a portion just before the partition wall 14. FIG. 5 is a perspective view of the main barrel 2 as viewed from the rear upper side of the rear space 16. As shown in FIG. 5, the partition wall 14 is formed at the axially central portion of the main barrel 2.

The circular through hole 17 for passing the light from a subject is formed at a substantially central portion of the partition wall 14. The optical axis of the taking optical system is passed through the center of the through hole 17. The front surface of the partition wall 14 exposed to the front space 15 is formed with a front boss portion 25 surrounding the through hole 17 and continuing in the circumferential direction of the through hole 17. Similarly, the rear surface of the partition wall 14 exposed to the rear space 16 is formed with a rear boss portion 26 surrounding the through hole 17 and continuing in the circumferential direction of the through hole 17. The partition wall 14 is further formed with three through holes 28 radially outside of the through hole 17. These three through holes 28 are located on a common circle and equally spaced from each other in the circumferential direction. In this preferred embodiment, one of the three through holes 28 is located directly below the through hole 17, and the other two through holes 28 are located at the given upper positions.

Further, the front boss portion 25 is formed with three supporting surfaces 31 as a specific embodiment of the supporting portion for supporting the first lens L3F in the present invention. Each supporting surface 31 is formed as an arcuate ridged portion slightly raised from the other portion of the front boss portion 25. These three supporting surfaces 31 are located in alternate relationship with the three through holes 28 so that each supporting surface 31 is located at the intermediate position between the adjacent two through holes 28. Similarly, the rear boss portion 26 is formed with three supporting surfaces 32 as a specific embodiment of the supporting portion for supporting the second lens L3R in the present invention. Each supporting surface 32 is formed as an arcuate ridged portion slightly raised from the other portion of the rear boss portion 26. These three supporting surfaces 32 are located in alternate relationship with the three through holes 28 so that each supporting surface 32 is located at the intermediate position between the adjacent two through holes 28. Accordingly, the three supporting surfaces 31 of the front boss portion 25 are respectively aligned to the three supporting surfaces 32 of the rear boss portion 26.

Figure 7:
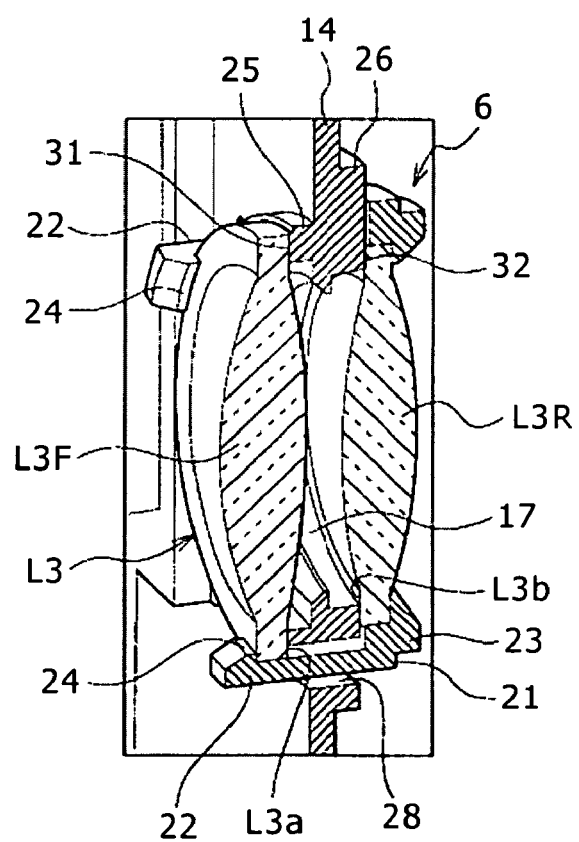
FIG. 7 is a cross section in perspective as taken along the line F-F in FIG. 6.

FIGS. 6 and 7 show a condition where the third lens group L3 is supported in the main barrel 2. The first lens L3F of the third lens group L3 is provided on the front surface of the partition wall 14, and the second lens L3R of the third lens group L3 is provided on the rear surface of the partition wall 14. The first and second lenses L3F and L3R are fixed to the partition wall 14 by the single third lens group holding frame 6.

Figure 8A:
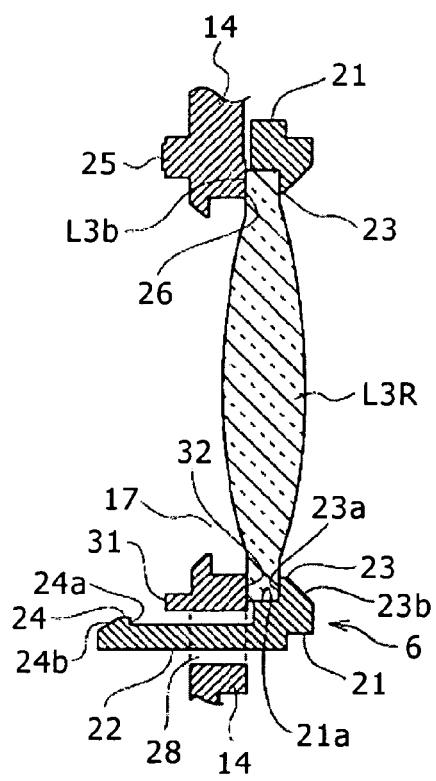
FIGS. 8A and 8B are sectional views for illustrating an operation of mounting first and second lenses of a third lens group to the main barrel by using the lens holding member.
Figure 8B:
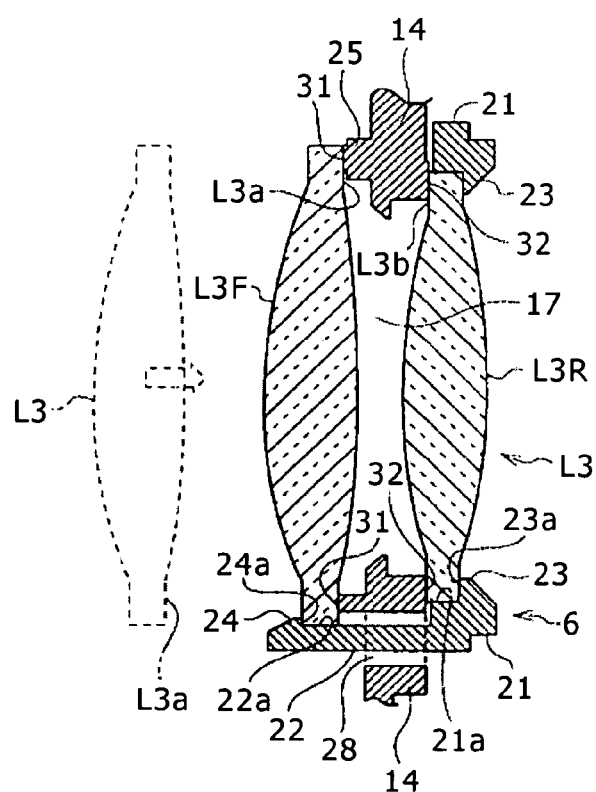

FIGS. 8A and 8B illustrate an operation of mounting the first and second lenses L3F and L3R to the main barrel 2. For example, the mounting operation for the first and second lenses L3F and L3R is performed in the following manner. The three supporting surfaces 31 of the front boss portion 25 and the three supporting surfaces 32 of the rear boss portion 26 have a very small height. Accordingly, in a part of FIGS. 8A and 8B and FIGS. 9 to 11 to be hereinafter referred to, the height of these supporting surfaces 31 and 32 is omitted.

As shown in FIG. 8A, the second lens L3R is preliminarily fitted to the inner surface of the annular portion 21 of the third lens group holding frame 6, and the third lens group holding frame 6 with the second lens L3R is inserted into the rear space 16 of the main barrel 2. Thereafter, the three arm portions 22 of the third lens group holding frame 6 are respectively inserted through the three through holes 28 of the partition wall 14 until the front ends of the arm portions 22 project into the front space 15. Thereafter, as shown in FIG. 8B, the first lens L3F is forcibly fitted to the inner surfaces of the three arm portions 22 from the front space 15. At this time, although the diameter of a circle formed by connecting the inner surfaces of the three hooks 24 of the three arm portions 22 is smaller than the diameter of the first lens L3F, the three arm portions 22 having elasticity are elastically deformed in the radially outward direction in mounting the first lens L3F to the three arm portions 22. Accordingly, the first lens L3F can be held within the three hooks 24 as shown in FIG. 8B. Thusly, the first and second lenses L3F and L3R can be held by the single third lens group holding frame 6.

Figure 9:
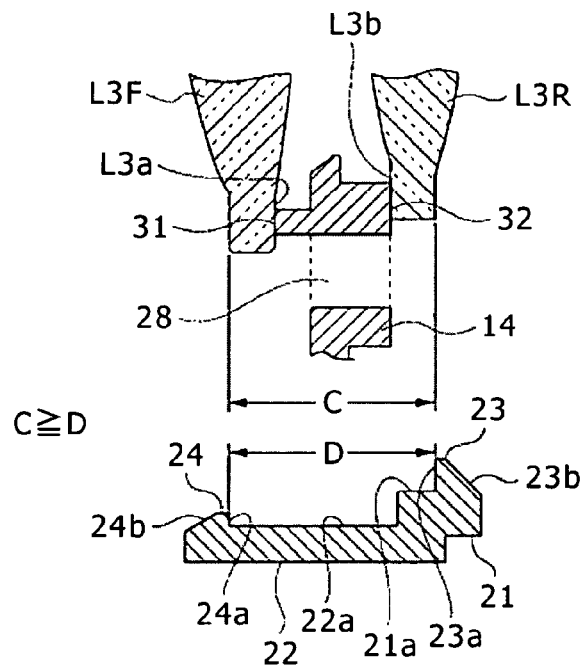
FIG. 9 is a sectional view for illustrating the dimensional relation between the first and second lenses and the lens holding member.

As shown in FIG. 9, the dimension D from the vertical surface 23a of the annular hook 23 of the third lens group holding frame 6 to the vertical surface 24a of each hook 24 is less than or equal to the dimension C from the first lens L3F to the second lens L3R in their mounted condition where the partition wall 14 is interposed therebetween. By setting the relation between the dimensions C and D to C≧D, no play is generated between the first lens L3F and the second lens L3R along the optical axis in their mounted condition, so that the first and second lenses L3F and L3R can be firmly fixed so as to abut against the supporting surfaces 31 and 32, respectively.

In the condition shown in FIG. 8B, shift alignment is performed so as to move the third lens group holding frame 6 in a direction perpendicular to the optical axis by using a shift alignment jig (not shown). That is, shift alignment is performed by moving the third lens group holding frame 6 in a direction perpendicular to the optical axis of the third lens group L3 so as to align the optical axis of the third lens group L3 to the optical axis of the taking optical system or to a reference position in the main barrel 2. After finishing this alignment operation, the third lens group holding frame 6 is fixed to the main barrel 2 at a suitable portion (e.g., the arm portions 22 and the through holes 28) by means of an adhesive or the like.

Figures 10A, 10B:
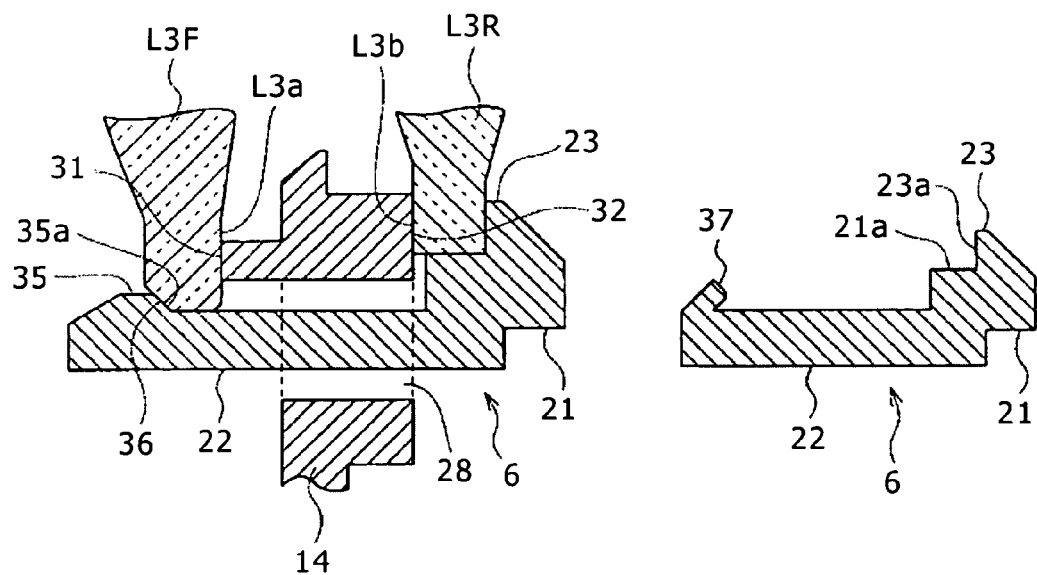
FIG. 10A is a sectional view showing a modification of the lens holding member and FIG. 10B is a sectional view showing another modification of the lens holding member.

FIG. 10A shows a modification of each hook 24 in this preferred embodiment. As shown in FIG. 10A, a hook 35 having an inclined surface 35a is formed in place of each hook 24 having the vertical surface 24a. That is, the inclined surface 35a is formed in place of the vertical surface 24a. In accordance therewith, the outer circumferential edge of the front surface of the first lens L3F is chamfered to form a chamfered portion 36 having the same inclination angle as that of the inclined surface 35a. That is, the chamfered portion 36 of the first lens L3F is adapted to abut against the inclined surface 35a of each hook 35. According to this modification, the first lens L3F can be easily mounted to the third lens group holding frame 6 by using the inclined surface 35a of each hook 35 as a guide, thus improving the workability in assembling the main barrel 2.

Furthermore, the inclined surface 35a can produce a force of normally pressing the first lens L3F against the partition wall 14. Accordingly, a frictional force can be produced between the first lens L3F and each supporting surface 31 of the partition wall 14, and a frictional force can also be produced between the second lens L3R and each supporting surface 32 of the partition wall 14, thereby firmly fixing the first and second lenses L3F and L3R at the given positions in the main barrel 2.

FIG. 10B shows another modification of each hook 24 in this preferred embodiment. As shown in FIG. 10B, a hook 37 is formed in place of each hook 24. Each hook 37 is formed as an elastic hook having suitable elasticity. Accordingly, an elastic force by each hook 37 can be applied to the first lens L3F. As a result, a frictional force can be produced between the first lens L3F and each supporting surface 31, and a frictional force can also be produced between the second lens L3R and each supporting surface 32, thereby firmly fixing the first and second lenses L3F and L3R at the given positions in the main barrel 2.

Figure 11:
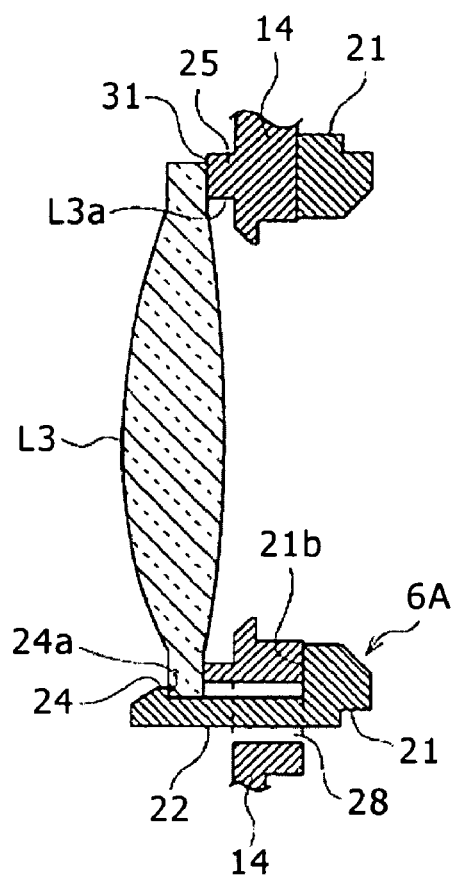
FIG. 11 is a sectional view showing a further modification of the lens holding member.

FIG. 11 shows a modification of the third lens group holding frame 6 in this preferred embodiment. As shown in FIG. 11, a third lens group holding frame 6A is used in place of the third lens group holding frame 6 in the case that the third lens group L3 is composed of one lens. Accordingly, the third lens group holding frame 6A is different from the third lens group holding frame 6 in the structure of the annular portion 21. That is, the annular portion 21 of the third lens group holding frame 6A has a vertical surface 21b abutting against the three supporting surfaces 32 of the partition wall 14. The three arm portions 22 project from the vertical surface 21b of the annular portion 21. Each arm portion 22 and its hook 24 are similar to those shown in FIGS. 7 to 9, and the other configurations are also similar to those in this preferred embodiment, so the description thereof will be omitted herein. According to this modification, only one lens can be firmly fixed to the third lens group holding frame 6A at the given position in the main barrel 2, and shift alignment can be performed simply and accurately.

FIGS. 12 to 15B show a modification of the first lens L3F in this preferred embodiment. As shown in FIGS. 12 to 15B, a first lens L3F2 is used in place of the first lens L3F, wherein the first lens L3F2 is tightly fixed by applying a bayonet mount system. This modification is different from this preferred embodiment in only the first lens L3F2, so that the other same parts are denoted by the same reference numerals and the description thereof will be omitted herein.

Figure 12:
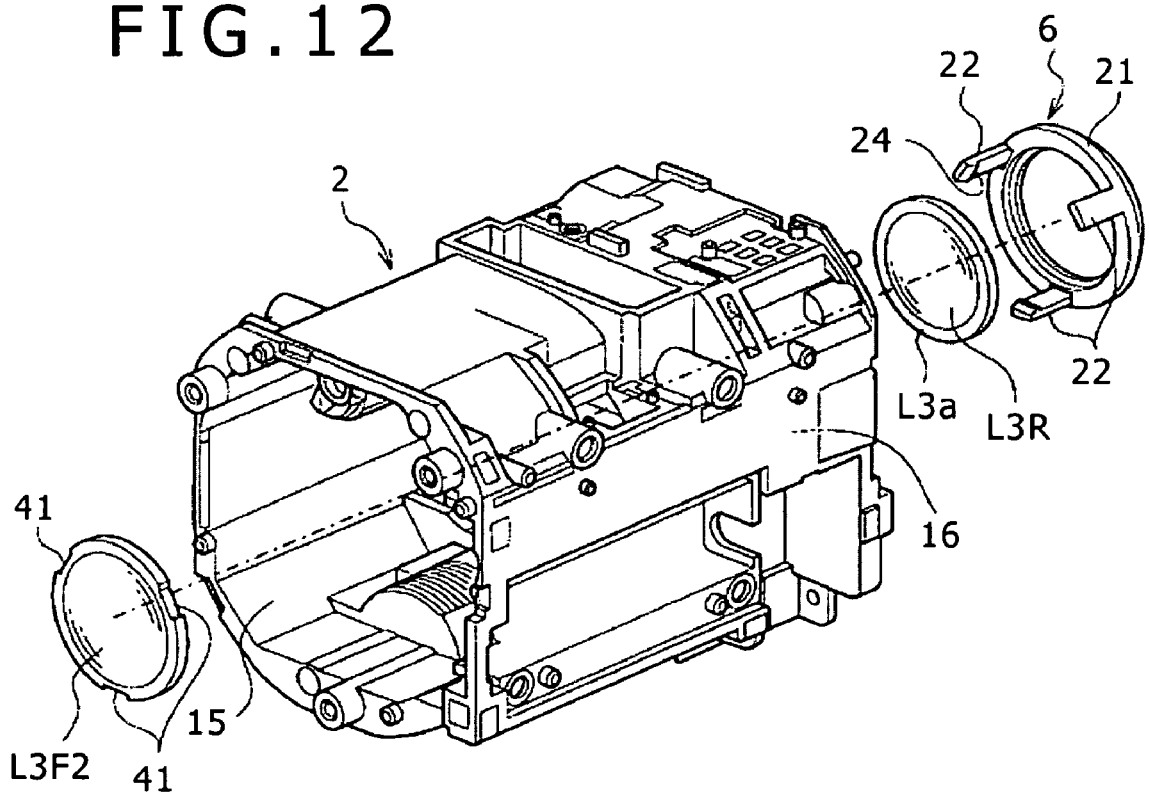
FIG. 12 is an exploded perspective view of a main barrel, showing a modification of the first lens.
Figure 13:
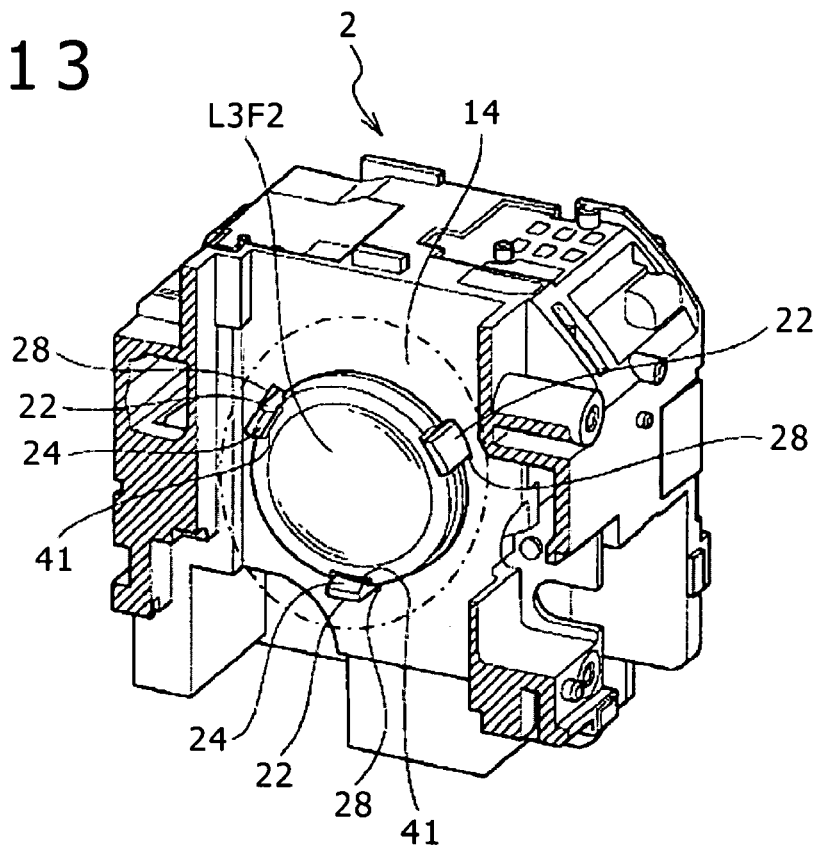
FIG. 13 is a partially cutaway, perspective view of the main barrel shown in FIG. 12 as cut along a vertical plane perpendicular to the optical axis at an axially intermediate portion thereof.

As shown in FIG. 12, all of the main barrel 2, the second lens L3R, and the third lens group holding frame 6 are similar to those shown in FIG. 1. The first lens L3F2 is different from the first lens L3F in the point that the outer circumference of the first lens L3F2 is formed with a plurality of (three in this modification) recesses 41. Each recess 41 is an arcuate recess having a suitable length along the outer circumference of the first lens L3F2, and these three recesses 41 are equally spaced in the circumferential direction of the first lens L3F2. Although the three recesses 41 are shown, two recesses or four or more recesses may be formed instead.

Figure 14:
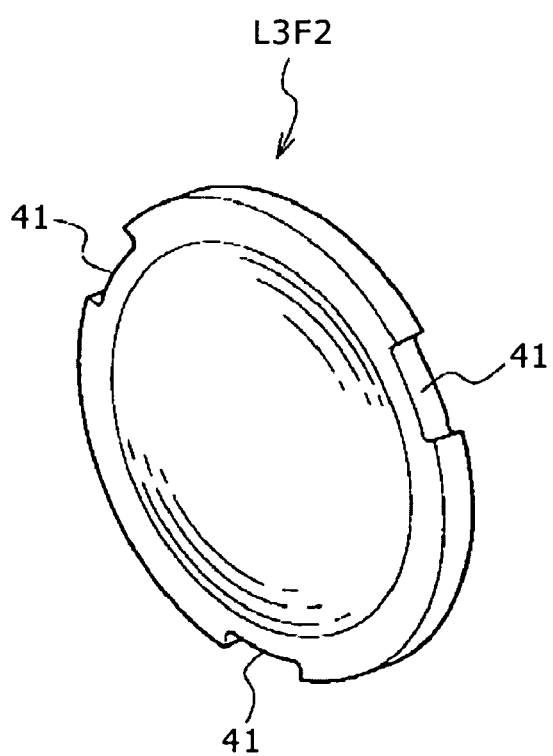
FIG. 14 is a perspective view of the first lens shown in FIG. 12.
Figures 15A, 15B:
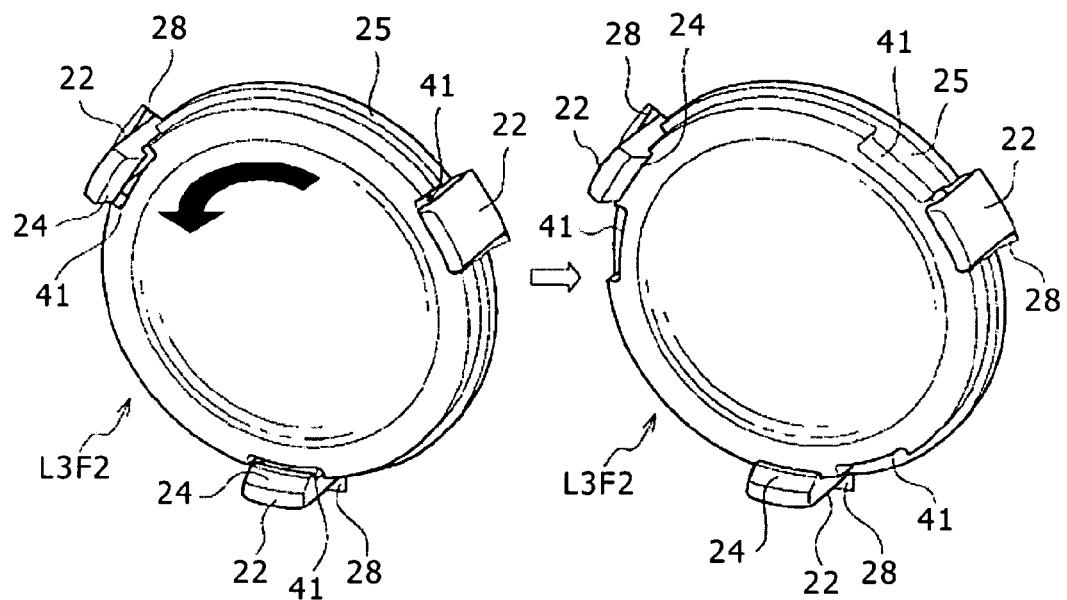
FIGS. 15A and 15B are perspective views for illustrating an operation of mounting the first lens shown in FIG. 12 by the rotation thereof.

As shown in FIGS. 14, 15A, and 15B, the outer diameter of the first lens L3F2 is substantially the same as the diameter of a circle formed by connecting the inner surfaces of the three arm portions 22 of the third lens group holding frame 6. The front end of the hook 24 of each arm portion 22 projects radially inward of the first lens L3F2. The depth of each recess 41 is set so as to allow the pass of each hook 24 in its free condition. Further, as similar to the dimensional relation shown in FIG. 9, the dimension D from the vertical surface 23a of the annular hook 23 of the third lens group holding frame 6 to the vertical surface 24a of each hook 24 is less than or equal to the dimension C from the first lens L3F2 to the second lens L3R in their mounted condition where the partition wall 14 is interposed therebetween.

The third lens group L3 composed of the first lens L3F2 and the second lens L3R is assembled in the following manner. As shown in FIG. 12, the first lens L3F2 is located in the front space 15 of the main barrel 2, and the second lens L3R and the third lens group holding frame 6 are located in the rear space 16 of the main barrel 2. The second lens L3R is preliminarily held by the third lens group holding frame 6, and the three arm portions 22 are inserted through the three through holes 28 of the partition wall 14. At this time, the three recesses 41 of the first lens L3F2 are preliminarily aligned to the three arm portions 22. Accordingly, the three arm portions 22 can be smoothly inserted through the three recesses 41 without any sliding frictional resistance so that each hook 24 is passed through the corresponding recess 41 as shown in FIG. 15A.

Thereafter, the first lens L3F2 is rotated in a counterclockwise direction, for example, as shown in FIG. 15A. As a result, the condition shown in FIG. 15B can be obtained, wherein the outer circumferential portion of the first lens L3F2 is engaged with the three hooks 24. In this condition, a frictional force is produced between the end surface of the first lens L3F2 and the vertical surface 24a of each hook 24, thereby firmly fixing the first and second lenses L3F2 and L3R. Thereafter, shift alignment is performed.

Figure 16:
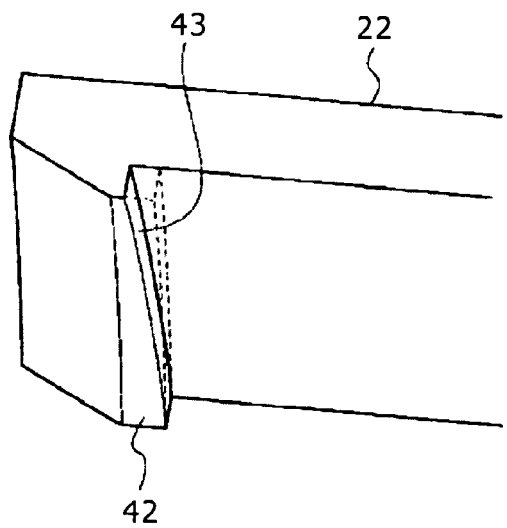
FIG. 16 is a perspective view showing a modification of each hook of the lens holding member.
Figure 17:
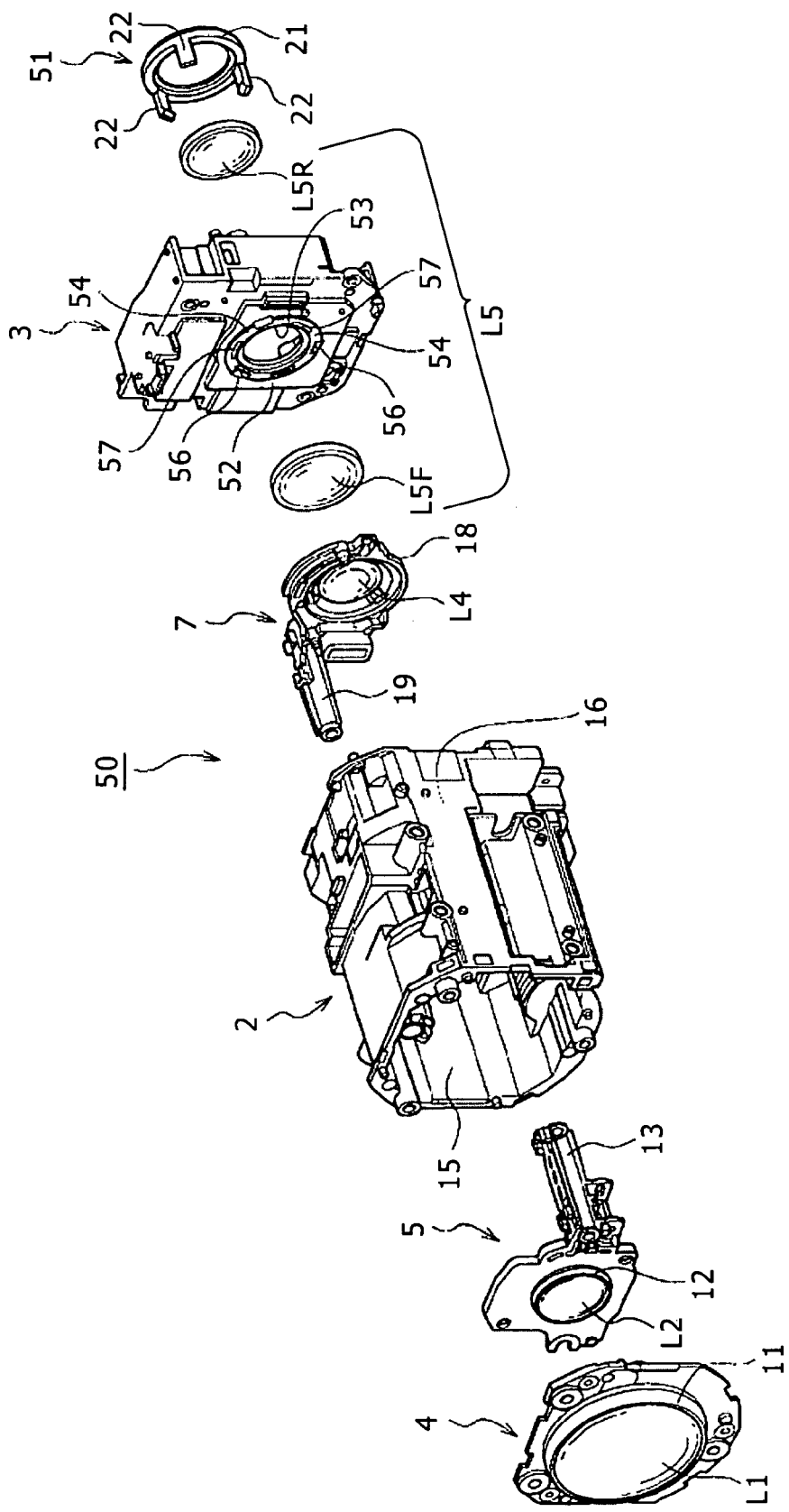
FIG. 17 is an exploded perspective view of a lens barrel according to a second preferred embodiment of the present invention.

FIG. 16 shows a modification of each hook 24. As shown in FIG. 16, a hook 42 is formed in place of each hook 24, wherein the hook 42 has an inclined surface 43 adapted to come into contact with the end surface of the first lens L3F2. Initially, the inclined surface 43 of each hook 42 is not in contact with the first lens L3F2. With the rotation of the first lens L3F2, the gap between the inclined surface 43 and the first lens L3F2 is gradually decreased. After coming into contact with the first lens L3F2, each hook 42 is gradually compressed owing to the inclined surface 43, thereby gradually increasing the tightening force of each hook 42 to the first lens L3F2. According to each hook 42 having the inclined surface 43, the first lens L3F2 can be rotated by a small force about the optical axis in the initial stage because the inclined surface 43 of each hook 42 is not in contact with the first lens L3F2. After the inclined surface 43 comes into contact with the first lens L3F2, the contact pressure of the inclined surface 43 is proportionally increased with an increase in rotational amount of the first lens L3F2. Accordingly, the mounting operation can be easily performed and the first lens L3F2 can be firmly fixed by each hook 42.

Second Preferred Embodiment

FIGS. 17 to 20 show a lens barrel 50 according to a second preferred embodiment of the present invention, wherein the lens holding structure according to an embodiment of the present invention is applied to the fifth lens group L5. The lens barrel 50 is different from the lens barrel 1 shown in FIG. 1 in the point that the fifth lens group L5 is composed of a first lens L5F and a second lens L5R. In accordance therewith, a fifth lens group holding frame 51 is provided, and a structure for mounting the first and second lenses L5F and L5R and the fifth lens group holding frame 51 is formed on a wall portion 52 of the rear barrel 3. Therefore, the first and second lenses L5F and L5R, the fifth lens group holding frame 51, and the rear barrel 3 will now be described in detail. The other same parts are denoted by the same reference numerals and the description thereof will be omitted herein.

Figure 18:
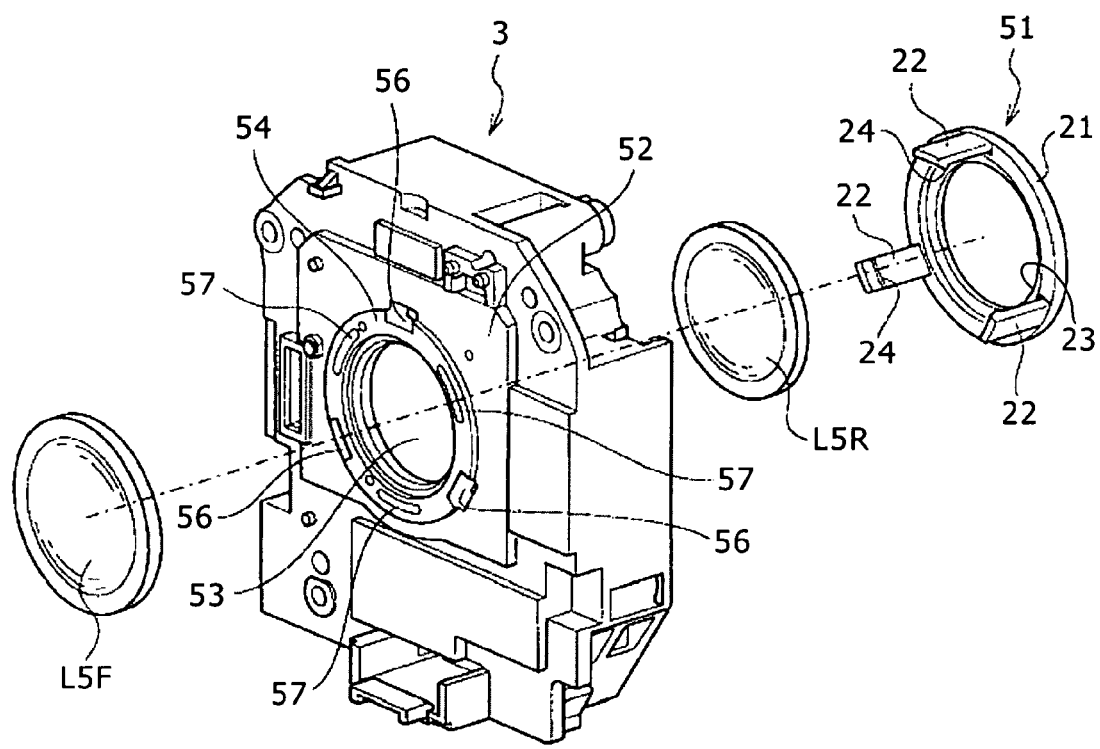
FIG. 18 is an exploded perspective view of a rear barrel included in the lens barrel shown in FIG. 17.
Figure 19:
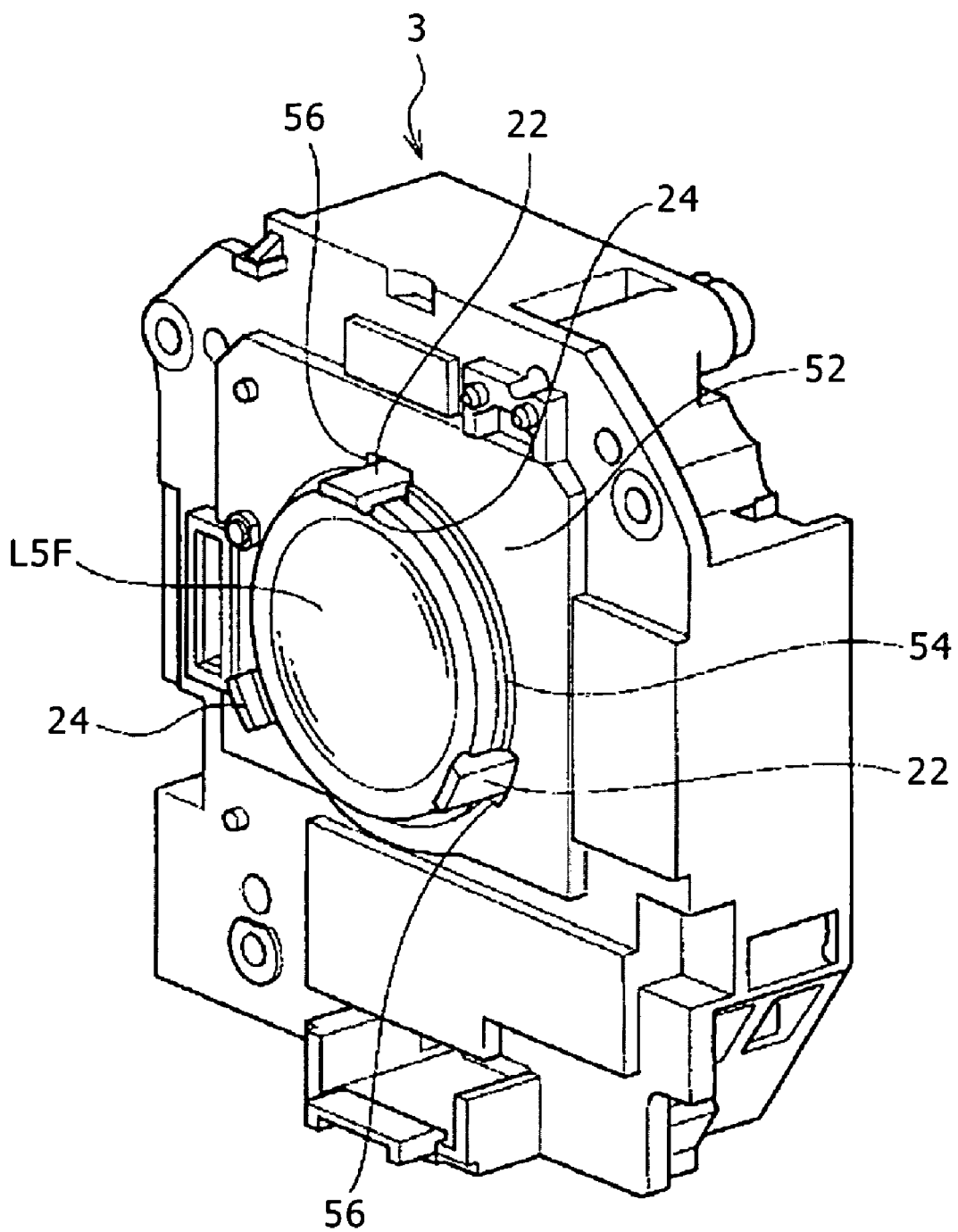
FIG. 19 is a perspective view of the rear barrel shown in FIG. 18 as viewed from the front side thereof.
Figure 20:
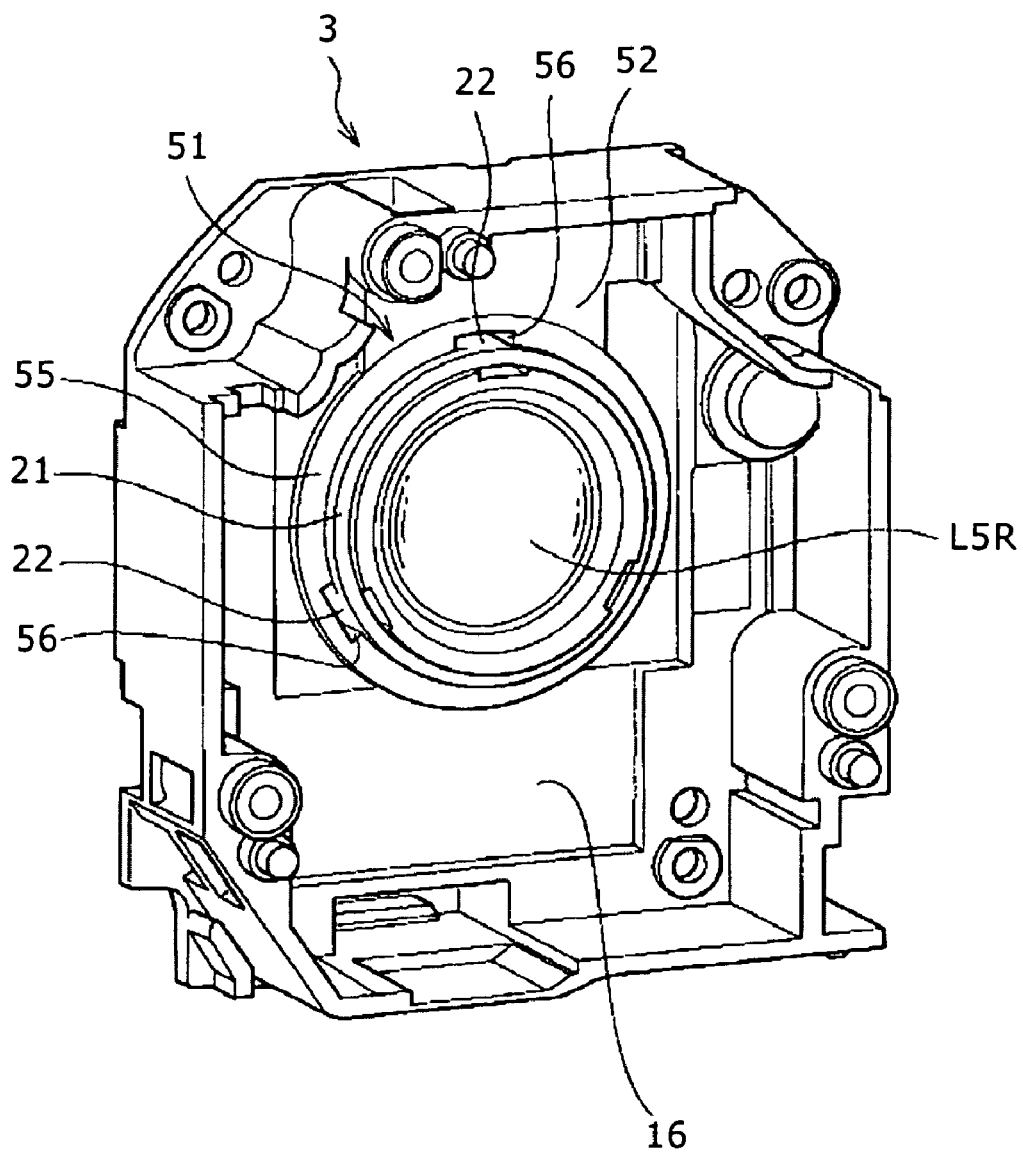
FIG. 20 is a perspective view of the rear barrel as viewed from the rear side thereof.

Referring to FIGS. 18 to 20, the rear barrel 3 is a second specific embodiment of the barrel body in the present invention. The rear barrel 3 is formed as a case-like member having the wall portion 52 on the front side and an opening on the rear side. The wall portion 52 of the rear barrel 3 is formed with a circular through hole 53 for passing the light from a subject. The first lens L5F of the fifth lens group L5 is located on the front side of the wall portion 52 having the through hole 53, and the second lens L5R of the fifth lens group L5 is located on the rear side of the wall portion 52. The circular through hole 53 is formed at a substantially central portion of the wall portion 52, and the optical axis of the taking optical system is passed through the center of the through hole 53.

The front surface of the wall portion 52 is formed with a front boss portion 54 surrounding the through hole 53 and continuing in the circumferential direction of the through hole 53. Similarly, the rear surface of the wall portion 52 is formed with a rear boss portion 55 surrounding the through hole 53 and continuing in the circumferential direction of the through hole 53. The wall portion 52 is further formed with three through holes 56 radially outside of the through hole 53. These three through holes 56 are located on a common circle and equally spaced from each other in the circumferential direction. In this preferred embodiment, one of the three through holes 56 is located directly above the through hole 53, and the other two through holes 56 are located at the given upper positions.

Further, the front boss portion 54 is formed with three supporting surfaces 57 as a specific embodiment of the supporting portion for supporting the first lens L5F in the present invention. Each supporting surface 57 is formed as an arcuate ridged portion slightly raised from the other portion of the front boss portion 54. These three supporting surfaces 57 are located in alternate relationship with the three through holes 56 so that each supporting surface 57 is located at the intermediate position between the adjacent two through holes 56. Similarly, the rear boss portion 55 is formed with three supporting surfaces (not shown) as a specific embodiment of the supporting portion for supporting the second lens L5R in the present invention. Each supporting surface of the rear boss portion 55 is formed as an arcuate ridged portion slightly raised from the other portion of the rear boss portion 55. These three supporting surfaces of the rear boss portion 55 are also located in alternate relationship with the three through holes 56 so that each supporting surface is located at the intermediate position between the adjacent two through holes 56. Accordingly, the three supporting surfaces 57 of the front boss portion 54 are respectively aligned to the three supporting surfaces of the rear boss portion 55.

As shown in FIG. 18, the fifth lens group holding frame 51 is a second specific embodiment of the lens holding member in the present invention. The fifth lens group holding frame 51 is similar to the third lens group holding frame 6. More specifically, the fifth lens group holding frame 51 has an annular portion 21 and three arm portions 22 projecting from one end surface of the annular portion 21. The annular portion 21 is formed with an annular hook 23 (second hook portion) projecting radially inward on the other end surface opposite to the arm portions 22. The front end of each arm portion 22 is formed with a hook 24 (first hook portion) projecting in the same direction as the direction of projection of the annular hook 23.

The first and second lenses L5F and L5R of the fifth lens group L5 are mounted to the rear barrel 3 by using the fifth lens group holding frame 51 in a manner similar to that in the case of mounting the first and second lenses L3F and L3R of the third lens group L3 to the main barrel 2 by using the third lens group holding frame 6. More specifically, as shown in FIG. 18, the first lens L5F is located on the front side of the wall portion 52 of the rear barrel 2, and the second lens L5R and the fifth lens group holding frame 51 are located on the rear side of the wall portion 52. Thereafter, the three arm portions 22 of the fifth lens group holding frame 51 are respectively inserted through the three through holes 56 of the wall portion 52. Thereafter, the first lens L5F is forcibly fitted to the inner surfaces of the three arm portions 22 from the front side of the wall portion 52. Accordingly, the first lens L5F is held within the three hooks 24 as shown in FIG. 19, and the second lens L5R is held inside the annular portion 21 of the fifth lens group holding frame 51 as shown in FIG. 20.

Thusly, the first and second lenses L5F and L5R can be held by the single fifth lens group holding frame 51. As mentioned above with reference to FIG. 9, the dimension D from the vertical surface 23a of the annular hook 23 of the fifth lens group holding frame 51 to the vertical surface 24a of each hook 24 is less than or equal to the dimension C from the first lens L5F to the second lens L5R in their mounted condition where the wall portion 52 is interposed therebetween. By setting the relation between the dimensions C and D to C≧D, no play is generated between the first lens L5F and the second lens L5R along the optical axis in their mounted condition, so that the first and second lenses L5F and L5R can be firmly fixed so as to abut against the supporting surfaces 57 of the front boss portion 54 and the supporting surfaces of the rear boss portion 55, respectively.

In the condition shown in FIGS. 19 and 20, shift alignment is performed so as to move the fifth lens group holding frame 51 in a direction perpendicular to the optical axis by using a shift alignment jig (not shown). That is, shift alignment is performed by moving the fifth lens group holding frame 51 in a direction perpendicular to the optical axis of the fifth lens group L5 so as to align the optical axis of the fifth lens group L5 to the optical axis of the taking optical system or to a reference position in the rear barrel 3. After finishing this alignment operation, the fifth lens group holding frame 51 is fixed to the rear barrel 3 at a suitable portion (e.g., the arm portions 22 and the through holes 56) by means of an adhesive or the like.

As a modification, a bayonet mount system may be applied to the first lens L5F as mentioned above with reference to FIGS. 12 to 15B.

Third Preferred Embodiment

Figure 21:
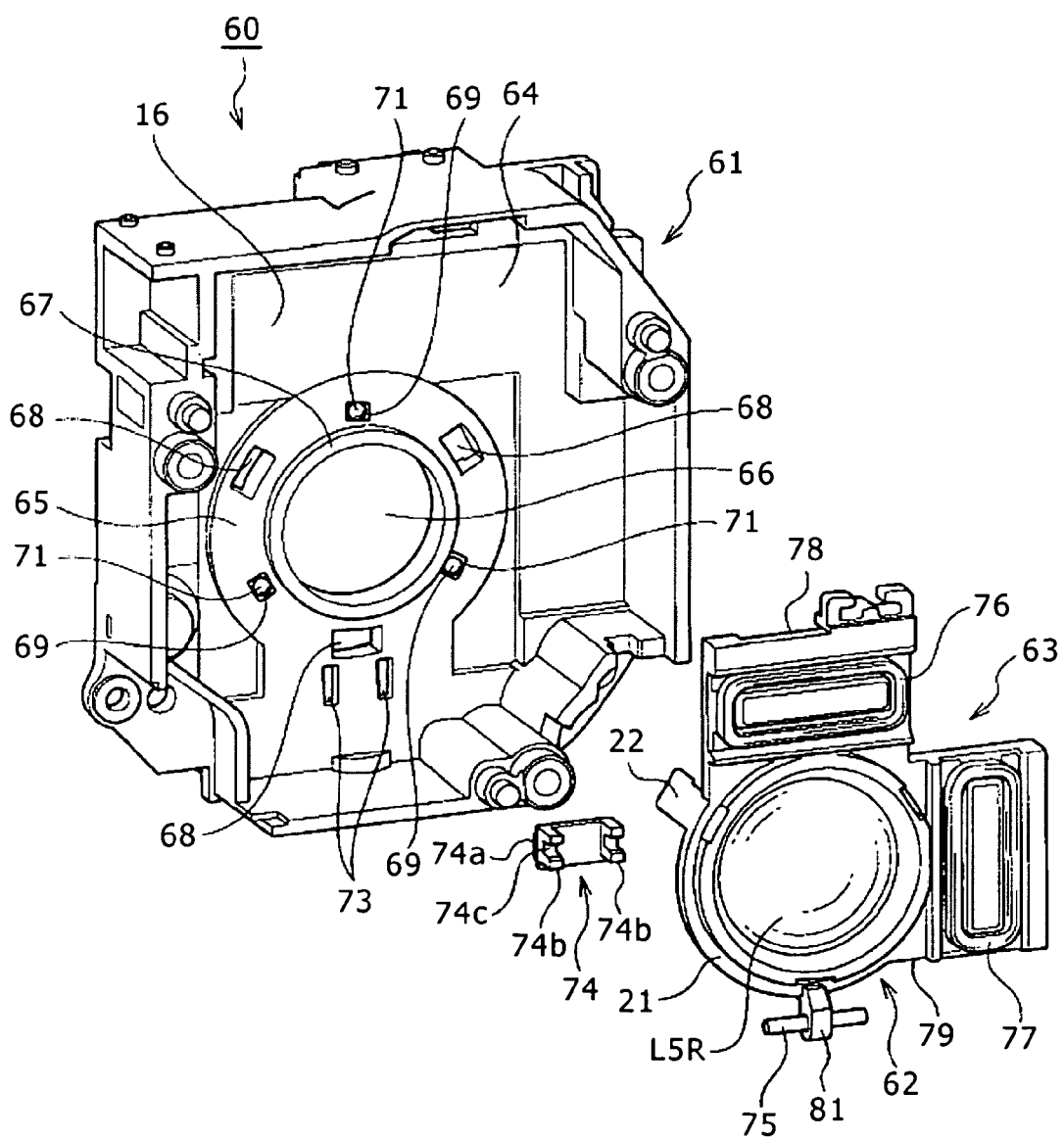
FIG. 21 is an exploded perspective view of a lens barrel according to a third preferred embodiment of the present invention as viewed from the rear side thereof.
Figure 22:
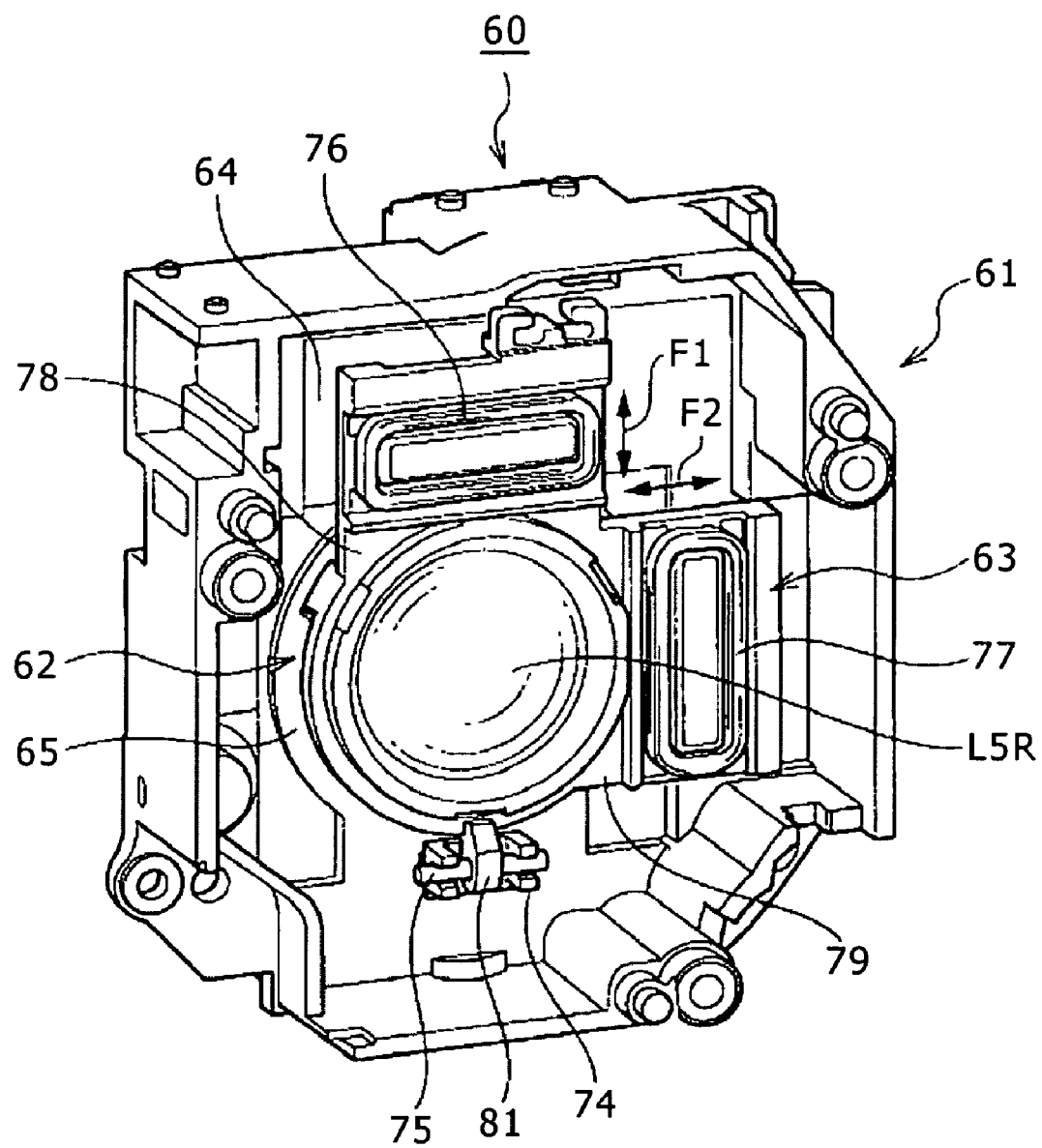
FIG. 22 is a perspective view of the lens barrel shown in FIG. 21.

FIGS. 21 and 22 show a lens barrel 60 according to a third preferred embodiment of the present invention. As similar to the second preferred embodiment, the lens holding structure according to an embodiment of the present invention is applied to the fifth lens group L5. The lens barrel 60 is different from the lens barrel 50 shown in FIG. 17 in the point that the fifth lens group L5 is configured as a lens for correction for camera shake. Therefore, a rear barrel 61, a fifth lens group holding frame 62 for holding the fifth lens group L5, and an actuator 63 for driving the fifth lens group L5 will now be described in detail. The other same parts are denoted by the same reference numerals and the description thereof will be omitted herein.

As shown in FIG. 21, the rear barrel 61 has a wall portion 64. An annular boss portion 65 is formed at a substantially central portion of the wall portion 64, and a circular through hole 66 for passing the light from a subject is formed radially inside of the annular boss portion 65. A first lens (not shown) of the fifth lens group L5 is located on the front side of the wall portion 64 having the through hole 66, and a second lens L5R of the fifth lens group L5 is located on the rear side of the wall portion 64. The optical axis of the taking optical system is passed through the center of the through hole 66, and the fifth lens group L5 is moved in two directions perpendicular to the optical axis, thereby obtaining an image with fluctuations due to camera shake being reduced or prevented.

The inner circumference of the boss portion 65 around the through hole 66 is formed with a supporting surface 67 (supporting portion) continuing in the circumferential direction. The boss portion 65 is further formed with three through holes 68 and three recesses 69 arranged on a common circle around the through hole 66. These three through holes 68 and the three recesses 69 are located in alternate relationship with each other at equal intervals. In this preferred embodiment, one of the three recesses 69 is located directly above the through hole 66, and one of the three through holes 68 is located directly below the through hole 66. The three arm portions 22 of the fifth lens group holding frame 62 are inserted through the three through holes 68, respectively. Three rolling balls 71 are accommodated in the three recesses 69, respectively. Each rolling ball 71 is preferably formed of metal such as steel and stainless steel. However, various other materials such as ceramics may be used for each rolling ball 71.

A pair of guide grooves 73 are formed at the lower portion of the wall portion 64 so as to extend vertically in parallel. A pair of engaging projections 74a of a sliding bearing 74 are slidably engaged with the pair of guide grooves 73, respectively. The sliding bearing 74 is further formed with a pair of bearing projections 74b opposite to the pair of engaging projections 74a. The pair of bearing projections 74b are spaced apart from each other in a direction perpendicular to the direction of extension of each engaging projection 74a. Each bearing projection 74b has a U-shaped recess 74c for slidably supporting a fixed shaft 85.

The fifth lens group holding frame 62 has an annular portion 21, three arm portions 22, and a pair of coil mounting portions 78 and 79 for respectively mounting a pair of coils 76 and 77 of the actuator 63. The three arm portions 22 project from one end surface of the annular portion 21. The pair of coil mounting portions 78 and 79 extend in orthogonal directions in the same plane as that of the annular portion 21. In this preferred embodiment, the first coil mounting portion 78 extends from the upper portion of the annular portion 21, and the second coil mounting portion 79 extends from one side portion of the annular portion 21. The first coil 76 is fixed to the first coil mounting portion 78, and the second coil 77 is fixed to the second coil mounting portion 79.

Each of the coils 76 and 77 is formed by winding a thin copper wire in the form of a substantially rectangular track by a given number of turns. The first coil 76 is located above the through hole 66 so that the longitudinal direction of the first coil 76 coincides with a horizontal direction, and the second coil 77 is located aside the through hole 66 so that the longitudinal direction of the second coil 77 coincides with a vertical direction. Further, the fifth lens group holding frame 62 is formed with an arm portion 81 projecting radially outward at a position diametrically opposite to the first coil mounting portion 78. The fixed shaft 75 is fixed to the arm portion 81 so as to project sideways from the opposite side surfaces of the arm portion 81.

The axis of the fixed shaft 75 is parallel to the longitudinal direction of the first coil 76. In the condition where the fixed shaft 75 is supported by the pair of bearing projections 74b of the sliding bearing 74, a predetermined gap is defined between the inside surface of each bearing projection 74b and the arm portion 81. Accordingly, the fifth lens group holding frame 62 is movable in the horizontal direction (toward the right and left sides as viewed in FIG. 22) by the gap defined between each bearing projection 74b and the arm portion 81. Further, the pair of engaging projections 74a of the sliding bearing 74 are shorter in length than the pair of guide grooves 73. Accordingly, the fifth lens group holding frame 62 is movable in the vertical direction (toward the upper and lower sides as viewed in FIG. 22) by the difference in length between each engaging projection 74a and each guide groove 73.

Thus, the fifth lens group holding frame 62 is movable in the two orthogonal directions by the respective predetermined amounts, so that the fifth lens group L5 can be moved according to the amount of camera shake to thereby correct for the camera shake. The fifth lens group holding frame 62 is mounted in the rear barrel 61 as shown in FIG. 22. In this condition, a pair of magnets (not shown) are provided on the front surface of the wall portion 64 so as to be opposed to the coils 76 and 77, respectively.

The pair of coils 76 and 77, the pair of magnets, and the fifth lens group holding frame 62 constitute the actuator 63 for moving the fifth lens group L5 as a camera shape correcting lens in the predetermined directions according to the amount of camera shake.

More specifically, when a current is passed through the first coil 76 of the actuator 63, a moving force F1 is produced in the fifth lens group holding frame 62 on the basis of the Fleming's rule, thereby moving the fifth lens group L5 in the vertical direction (toward the upper and lower sides as viewed in FIG. 22). On the other hand, when a current is passed through the second coil 77, a moving force F2 is produced in the fifth lens group holding frame 62 on the basis of the Fleming's rule, thereby moving the fifth lens group L5 in the horizontal direction (toward the right and left sides as viewed in FIG. 22).

Fourth Preferred Embodiment

Figure 23:
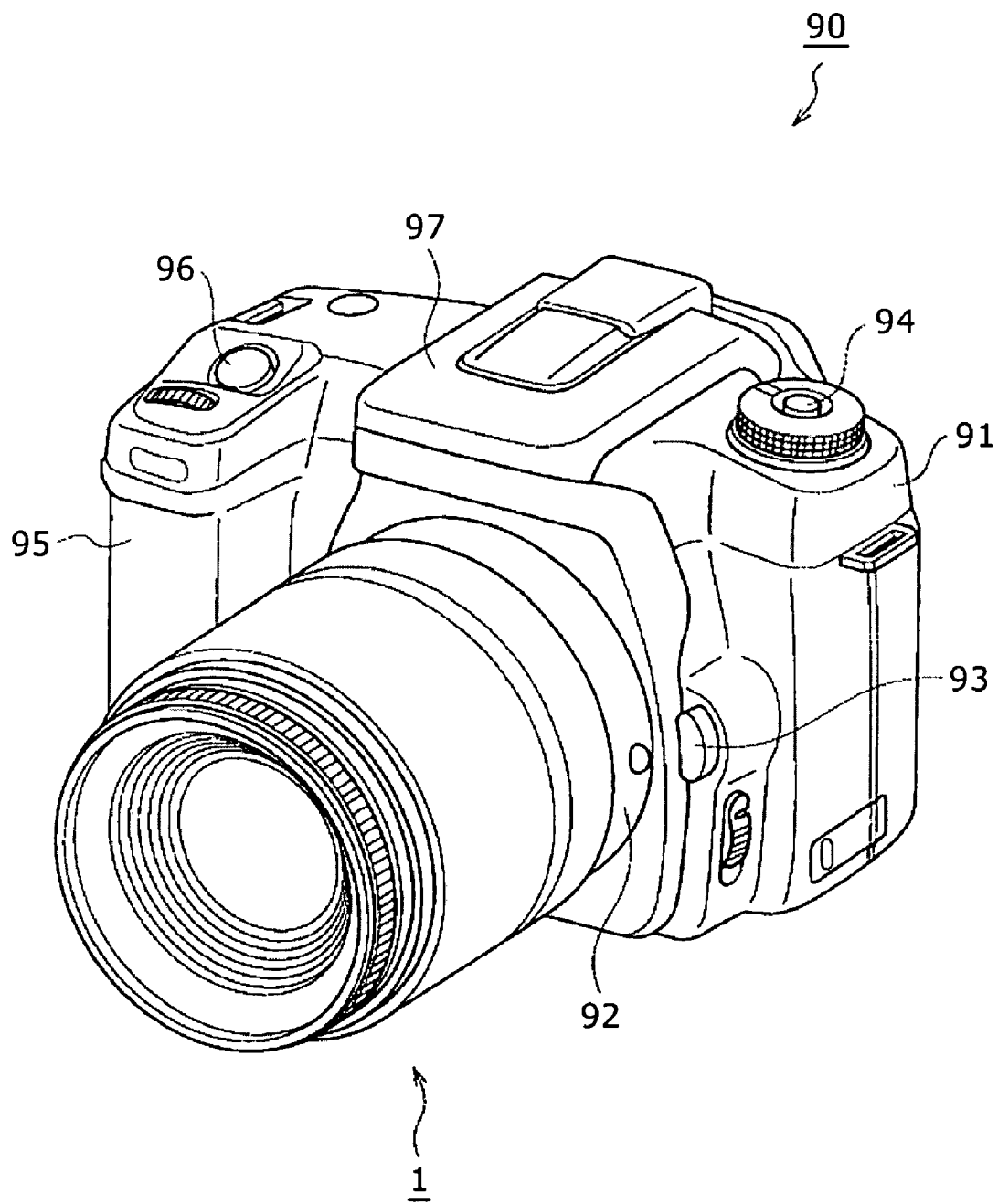
FIG. 23 is a perspective view of a digital still camera as a preferred embodiment of the imaging apparatus according to an embodiment of the present invention.

FIG. 23 shows an electronic still camera 90 according to a fourth preferred embodiment of the present invention as a preferred embodiment of the imaging apparatus including the lens barrel 1, 50, or 60 mentioned above. The electronic still camera 90 includes a camera body 91. The lens barrel 1 (or the lens barrel 50 or 60) as an interchangeable taking lens unit is detachably mounted to the camera body 91.

The camera body 91 is a horizontally elongated case-like body having an inside space. Although not shown, this inside space accommodates a wiring board on which various electronic parts are mounted, a battery as a power source, a storage device, and other various devices or parts. A mount portion 92 for mounting the lens barrel 1 is formed on the front surface of the camera body 91 at a substantially central position thereof. Further, a lens release button 93 for use in interchanging the lens barrel 1 is provided near the mount portion 92.

A mode selector dial 94 is provided at a right upper portion of the camera body 91 as viewed from the front side thereof. By operating the mode selector dial 94, various modes of the camera can be selectively set. For example, the various modes include various taking modes, a reproduction mode for reproducing images, and a communication mode for performing data communication with external equipment. The various taking modes may include a portrait mode, landscape mode, and full-automatic mode.

Further, a grip portion 95 adapted to be gripped by an operator is formed at the left end portion of the camera body 91 as viewed from the front side thereof. A battery storing chamber and a card storing chamber are defined in the grip portion 95. A battery such as a lithium ion battery is stored as a power source for the camera in the battery storing chamber, and an external storage device such as a memory card for recording image data on an image formed by the lens barrel 1 is removably stored into the card storing chamber.

A shutter release button 96 for directing the start of exposure is provided on the upper surface of the grip portion 95 of the camera body 91. The shutter release button 96 is a two-stage detectable button capable of detecting two different conditions, i.e., a half-depressed condition and a full-depressed condition. When the shutter release button 96 is half depressed to make the half-depressed condition mentioned above, the camera 90 performs a standby operation (e.g., AF control operation) for obtaining a still image (actually taken picture) to be recorded in relation to a subject. When the shutter release button 96 is further depressed to make the full-depressed condition mentioned above, the camera 90 performs a picture taking operation (a series of operations including an exposure operation on an optical image of the subject by the use of an image sensor and an image processing operation for applying predetermined image processing to an image signal obtained by the above exposure operation).

An optical viewfinder is provided on the back surface of the camera body 91 at its upper portion. The operator can decide a composition as looking through the optical viewfinder to visually recognize the optical image formed through the lens barrel 1. That is, the composition can be decided by using the viewfinder. In the electronic still camera 90, however, the composition can also be decided by using a live view image displayed on a back monitor (not shown). The operation for deciding the composition by using the optical viewfinder and the operation for deciding the composition by using the live view display may be selectively performed by operating a selector dial.

The back monitor may be configured as a color liquid crystal display (LCD). The back monitor can display a menu screen for setting picture taking conditions or the like and can also display the images recorded in the memory card in the reproduction mode. In the case that the operator selects the decision of the composition by the live view display rather than the decision of the composition by the optical viewfinder, a plurality of time-series images (i.e., moving images) obtained by the image sensor are displayed as a live view image by the back monitor. A flash storing portion 97 is provided on the front surface of the camera body 91 at its upper portion, and a flash device (not shown) is stored in the flash storing portion 97 so that the flash device can be raised and lowered.

According to an embodiment of the present invention having the above-mentioned configuration, the accuracy of tilting of the lens can be improved to prevent or suppress a degradation in optical performance. Further, the direction of placement of the lens barrel in the alignment operation can be freely set without any added parts. Further, floating of the lens holding frame from the main barrel or the rear barrel in or after the alignment operation can be prevented to thereby prevent a degradation in optical performance. Further, the possibility of misalignment due to impact or the like can be reduced without any added parts.

The present invention is not limited to the above preferred embodiments, but various modifications may be made without departing from the scope of the present invention. For example, while the taking optical system is configured by the combination of five lens groups in the above preferred embodiments, the number of lens groups may be four or less or six or more. Further, while the imaging apparatus according to an embodiment of the present invention is applied to an electronic still camera in the above preferred embodiments, the present invention is applicable to various other imaging apparatuses such as a digital video camera, film-type single-lens reflex camera, analog video camera, and monitoring camera.

It should be understood by those skilled in the art that various modifications, combinations, sub-combinations and alterations may occur depending on design requirements and other factor in so far as they are within the scope of the appended claims or the equivalents thereof.

What is claimed is:

1. A lens barrel comprising:
   a lens having a reference portion;
   a barrel body having a supporting portion adapted to come into contact with said reference portion of said lens; and
   a lens holding member for holding said lens so that said lens is sandwiched between said lens holding member and said barrel body in the condition where said reference portion of said lens is biased against said supporting portion of said barrel body,
   wherein:
   said lens comprises a first lens and a second lens arranged on a common optical axis;
   said lens holding member has an annular portion and a plurality of elastic portions projecting from one end surface of said annular portion, each elastic portion having a first hook portion formed at a front end thereof capable of holding said first lens; and
   an outer circumference of said first lens is formed with a plurality of recesses configured to respectively allow first hook portions of said plurality of elastic portions to pass.

2. The lens barrel according to claim 1, wherein
   each of said first and second lenses having a reference portion;
   said supporting portion includes
   a first supporting portion adapted to come into contact with said reference portion of said first lens, and
   a second supporting portion formed opposite to said first supporting portion and adapted to come into contact with said reference portion of said second lens; and
   said first and second lenses are held by said lens holding member in the condition where said reference portion of said first lens is biased against said first supporting portion and said reference portion of said second lens is biased against said second supporting portion.

3. The lens barrel according to claim 2, wherein said lens holding member has
   the first hook portion adapted to come into contact with said first lens, and
   a second hook portion adapted to come into contact with said second lens.

4. The lens barrel according to claim 3, wherein
   said second hook portion is formed on said annular portion.

5. The lens barrel according to claim 4, wherein said first hook portion has an inclined surface adapted to come into contact with said first lens.

6. The lens barrel according to claim 1, wherein a tightening force of each elastic portion to said first lens is adjustable by rotation of said first lens.

7. A lens barrel comprising:
   a lens having a reference portion;
   a barrel body having a supporting portion adapted to come into contact with said reference portion of said lens; and
   a lens holding member for holding said lens so that said lens is sandwiched between said lens holding member and said barrel body in the condition where said reference portion of said lens is biased against said supporting portion of said barrel body,
   wherein:
   said lens comprises a first lens and a second lens arranged on a common optical axis, each of said first and second lenses having a reference portion;
   said supporting portion includes a first supporting portion adapted to come into contact with said reference portion of said first lens, and a second supporting portion formed opposite to said first supporting portion and adapted to come into contact with said reference portion of said second lens; and
   said first and second lenses are held by said lens holding member in the condition where said reference portion of said first lens is biased against said first supporting portion and said reference portion of said second lens is biased against said second supporting portion,
   wherein said lens holding member has a first hook portion adapted to come into contact with said first lens, and a second hook portion adapted to come into contact with said second lens,
   wherein:
   said lens holding member has an annular portion and three or more elastic portions projecting sideways from one end surface of said annular portion, each elastic portion having a front end capable of holding said first lens;
   said second hook portion is formed on said annular portion; and
   said first hook portion is formed at the front end of each elastic portion, and
   wherein:
   an outer circumference of said first lens is formed with three or more recesses adapted to respectively engage with said three or more elastic portions; and
   a tightening force of each elastic portion to said first lens is adjustable by the rotation of said first lens.

8. An imaging apparatus comprising:
   a body portion; and
   a lens barrel mounted on said body portion;
   said lens barrel including
   a lens having a reference portion,
   a barrel body having a supporting portion adapted to come into contact with said reference portion of said lens, and
   a lens holding member for holding said lens so that said lens is sandwiched between said lens holding member and said barrel body in the condition where said reference portion of said lens is biased against said supporting portion of said barrel body,
   wherein:
   said lens comprises a first lens and a second lens arranged on a common optical axis;
   said lens holding member has an annular portion and a plurality of elastic portions projecting from one end surface of said annular portion, each elastic portion having a first hook portion formed at a front end thereof capable of holding said first lens; and
   an outer circumference of said first lens is formed with a plurality of recesses configured to respectively allow first hook portions of said plurality of elastic portions to pass.

9. The imaging apparatus according to claim 8, wherein a tightening force of each elastic portion to said first lens is adjustable by rotation of said first lens.

* * * * *